(12) United States Patent
Ohlsson

(10) Patent No.: US 10,491,580 B2
(45) Date of Patent: Nov. 26, 2019

(54) METHODS AND APPARATUSES FOR ENABLING AN ESTABLISHMENT OF A SECOND SECURE SESSION OVER A COMMUNICATION NETWORK

(71) Applicant: Telefonaktiebolaget LM Ericsson (publ), Stockholm (SE)

(72) Inventor: Oscar Ohlsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 182 days.

(21) Appl. No.: 15/317,489

(22) PCT Filed: Jun. 23, 2014

(86) PCT No.: PCT/SE2014/050773
§ 371 (c)(1),
(2) Date: Dec. 9, 2016

(87) PCT Pub. No.: WO2015/199586
PCT Pub. Date: Dec. 30, 2015

(65) Prior Publication Data
US 2017/0134357 A1  May 11, 2017

(51) Int. Cl.
*H04L 29/08* (2006.01)
*H04L 29/06* (2006.01)

(52) U.S. Cl.
CPC ............ *H04L 63/08* (2013.01); *H04L 63/166* (2013.01); *H04L 65/1006* (2013.01); *H04L 67/141* (2013.01); *H04L 67/146* (2013.01)

(58) Field of Classification Search
CPC ..... H04L 63/08; H04L 63/166; H04L 67/144; H04L 67/146; H04L 67/1006
See application file for complete search history.

(56) References Cited

U.S. PATENT DOCUMENTS 7,111,162 B1 * 9/2006 Bagepalli ............ H04L 63/0428
709/227
2004/0098588 A1 * 5/2004 Ohba ...................... H04L 63/08
713/169

(Continued)

OTHER PUBLICATIONS

International Preliminary Report on Patentability and Written Opinion issued in Application No. PCT/SE2014/050773 dated Dec. 27, 2016, 10 pages.

(Continued)

*Primary Examiner* — Ellen Tran
(74) *Attorney, Agent, or Firm* — Rothwell, Figg, Ernst & Manbeck, P.C.

(57) ABSTRACT

This disclosure provides a method, performed in a client terminal (50), for enabling an establishment of a second secure session over a communication network. The second secure session is additional to a first secure session. The first secure session is established using a session establishment protocol and a transport security protocol. The method performed in the client terminal (50) comprises obtaining a session identifier of the first secure session; and obtaining a credential identifier, the credential identifier identifying a server terminal (60) of the first secure session. The method performed in the client terminal (50) comprises associating the credential identifier to the session identifier of the first secure session; and storing the session identifier and the credential identifier associated with the session identifier of the first secure session.

15 Claims, 11 Drawing Sheets

(56) References Cited

U.S. PATENT DOCUMENTS

| | | |
|---|---|---|
| 2005/0038906 A1 | 2/2005 | Banes et al. |
| 2010/0031042 A1* | 2/2010 | Di Crescenzo ..... H04L 63/0869 |
| | | 713/169 |
| 2012/0023241 A1 | 1/2012 | Goel et al. |
| 2013/0305036 A1 | 11/2013 | Vos |
| 2014/0298415 A1* | 10/2014 | Xie .................... H04L 61/2589 |
| | | 726/3 |

OTHER PUBLICATIONS

The Extended European Search Report issued in Application No. 14895586.7 dated Apr. 3, 2017, 7 pages.
International Search Report issued in Application PCT/SE2014/050773 dated Mar. 26, 2015, 5 pages.
J. Lennox: "Connection-Oriented Media Transport over the Transport Layer Security (TLS) Protocol in the Session Description Protocol (SDP)", Network Working Group, Request for Comments: 4572, Updates: 4145, Category: Standards Track, Columbia University, Jul. 2006, 17 pages.
J. Salowey et al: "Transport Layer Security (TLS) Session Resumption without Server-Side State", Network Working Group, Request for Comments: 5077, Obsoletes: 4507, Category: Standard Track, Jan. 2008, 20 pages.

\* cited by examiner

METHODS AND APPARATUSES FOR ENABLING AN ESTABLISHMENT OF A SECOND SECURE SESSION OVER A COMMUNICATION NETWORK

CROSS REFERENCE TO RELATED APPLICATION

This application is a 35 U.S.C. § 371 National Stage of International Application No. PCT/SE2014/050773, filed Jun. 23, 2014, designating the United States, the disclosure of which is incorporated by reference.

TECHNICAL FIELD

The present disclosure pertains to the field of secure session establishment over a communication network. More specifically, the disclosure relates to methods and terminals for enabling an establishment of a second secure session over a communication network.

BACKGROUND

Transport Layer Security, TLS, is the standard protocol defined for securing traffic based on the Transport Control Protocol, TCP. The protocol starts by a handshaking procedure whereby a client terminal and a server terminal establish a TLS session and agree on session parameters, such as a common set of security parameters (e.g. keys and ciphering algorithms). The client terminal and the server terminal then use these session parameters to protect the application data sent between the client terminal and the server terminal.

Datagram Transport Layer Security, DTLS, is a protocol based on TLS that provides the same security functionality as TLS but for traffic based on User Datagram Protocol, UDP. An extension to DTLS has been developed, called DTLS-SRTP, which uses the established key to protect Real-time Transport protocol, RTP, data (e.g. audio/video) by using Secure Real-time Transport Protocol, SRTP.

TLS and DTLS-SRTP are often used to protect real-time peer-to-peer multimedia sessions established using Session Initiation Protocol, SIP. TLS can be used to protect e.g. a session established using Message Session Relay Protocol, MSRP and DTLS-SRTP can be used to protect an RTP audio or video session.

TLS (as well as DTLS and DTLS-SRTP) allows a session to be resumed or duplicated using the TLS session resumption or duplication feature. A client terminal can request a session to be resumed or duplicated by including the identifier of the session in the start of the TLS handshake procedure with a server terminal. If the server terminal has stored the session parameters and agrees to resume or duplicate the session, the server terminal and the client perform an abbreviated handshake procedure and then the client terminal and the server terminal can start to exchange application data protected using existing session parameters, such as keys. An abbreviated handshake, as opposed to a full handshake, increases performance as it involves fewer round-trips and less cryptographic computations. The TLS session resumption feature can be applied whenever a client terminal initiates multiple connections to the same server terminal.

To be able to use the TLS session resumption or duplication feature, the TLS client terminal must identify the session to be resumed. In client-server protocols, a session is typically identified at the client side using the IP address and port of the server host. However, this approach is not reliable as the IP address and port of a remote terminal often changes, especially in e.g. a peer-to-peer media session. The port of a remote terminal is typically an ephemeral one that is selected afresh for each new multimedia session. Additionally, the remote terminal may have multiple IP addresses which it switches between (due to e.g. cellular access and wireless local area network access). Also, the remote terminal may be behind a network address translation, NAT, which performs IP and port mapping. Therefore, it becomes increasingly important to find a solution for resumption or duplication of a secure session that solves these problems.

SUMMARY

An object of the present disclosure is to provide methods and terminals for enabling an establishment of a second secure session which seeks to mitigate, alleviate, or eliminate one or more of the above-identified deficiencies in the art and disadvantages singly or in any combination and to provide improved methods for enabling an establishment of a second secure session, such as for resuming a secure session and/or for duplicating a secure session.

This object is obtained by a method, performed in a client terminal, for enabling an establishment of a second secure session over a communication network. The second secure session is additional to a first secure session. The first secure session is established using a session establishment protocol and a transport security protocol. The method performed in the client terminal comprises obtaining a session identifier of the first secure session; and obtaining a credential identifier, the credential identifier identifying a server terminal of the first secure session. The method performed in the client terminal comprises associating the credential identifier to the session identifier of the first secure session; and storing the session identifier and the credential identifier associated with the session identifier of the first secure session.

It is an advantage of this disclosure that a secure session is identified in a reliable way using a credential identifier and thereby increases the likelihood of successfully resuming a first session or duplicating a first session in changing networking scenarios. Associating a credential identifier to a session identifier is a more robust solution than existing solutions based on IP address and port. The disclosure overcomes thus the lack of reliability linked to using IP address and ports to identify a secure session at a client terminal as IP addresses and ports are much more prone to frequent changes. This disclosure allows reducing the delay and processing required by the secure session establishment (e.g. TLS handshake) even for a session with terminals having dynamic IP addresses and ports.

According to one aspect of this disclosure, the method performed in the client terminal further comprises receiving from the server terminal a message requesting or accepting the establishment of the second secure session; obtaining a credential identifier from the received message; and determining whether the obtained credential identifier matches the credential identifier associated with the session identifier of the first secure session. The method performed in the client terminal comprises retrieving the session identifier of the first secure session when it is determined that the obtained credential identifier matches the credential identifier associated with the session identifier of the first secure session. The disclosure allows an additional secure session to be reliably identified for establishment, e.g. resumption and/or duplication, regardless of the type of transport security protocols, and regardless of the type of session establishment protocols.

According to another aspect of this disclosure, the method performed in the client terminal further comprises initiating the establishment of the second secure session using the retrieved session identifier in an abbreviated establishment procedure of the transport security protocol when it is determined that the obtained credential identifier matches the credential identifier associated with the session identifier of the first secure session. The method performed in the client terminal comprises initiating the establishment of the second secure session using a full establishment procedure of the transport security protocol, when it is not determined that the obtained credential identifier matches the credential identifier associated with the session identifier of the first secure session. This provides an advantage in increasing the number of opportunities where a secure session is eligible for (re-)establishment, e.g. resumption and/or duplication. This disclosure thus enables faster session establishment using abbreviated handshake even when a terminal has changed its port and IP address.

This disclosure relates to a method, performed in a client terminal, for enabling an establishment of a second secure session over a communication network. The second secure session is additional to a first secure session. The first secure session is established using a session establishment protocol and a transport security protocol. The method performed in the client terminal comprises sending to a server terminal a message requesting or accepting the establishment of the second secure session; receiving from the server terminal the session identifier of the first secure session; and determining if the received session identifier matches the stored session identifier of the first secure session. The method comprises initiating the establishment of the second secure session using the received session identifier in an abbreviated establishment procedure of the transport security protocol when it is determined that the received session identifier matches the stored session identifier of the first secure session. The method performed in the client terminal comprises initiating the establishment of the second secure session using a full establishment procedure of the transport security protocol when it is not determined that the received session identifier matches the stored session identifier of the first secure session. This enables a client terminal to initiate a resumption or duplication of a secure session based on a session identifier received from a server terminal.

This disclosure relates to a method, performed in a server terminal, for enabling an establishment of a second secure session over a communication network. The second secure session is additional to a first secure session. The first secure session is established using a session establishment protocol and a transport security protocol. The method performed in the server terminal comprises obtaining a session identifier of the first secure session; and obtaining a credential identifier, the credential identifier identifying a client terminal of the first secure session. The method performed in the server terminal comprises associating the credential identifier to the session identifier of the first secure session; and storing the session identifier and the credential identifier associated with the session identifier of the first secure session. This disclosure allows as much a server terminal as a client terminal to determine the session identifier of a session to be (re-) established (e.g. resumed or duplicated) based on a credential identifier of the other party. It therefore increases the chances for a secure session to be re-established, as the server terminal is able find the session identifier even in situations where the client terminal cannot.

According to one aspect of this disclosure, the method performed in the server terminal further comprises receiving from the client terminal a message requesting or accepting the establishment of the second secure session, obtaining a credential identifier from the received message, and determining whether the obtained credential identifier matches the credential identifier associated with the session identifier of the first secure session. The method performed in the server terminal comprises retrieving the session identifier of the first secure session when it is determined that the obtained credential identifier matches the credential identifier associated with the session identifier of the first secure session. The method performed in the server terminal comprises sending to the client terminal the retrieved session identifier of the first secure session when it is determined that the obtained credential identifier matches the credential identifier associated with the session identifier of the first session.

According to one aspect of this disclosure, the step of sending to the client terminal the retrieved session identifier of the first secure session may comprise sending to the client terminal the retrieved session identifier in a response to the message requesting or accepting the establishment of the second secure session. This provides to the server terminal the ability to support the client terminal by sending the session identifier to the client terminal so that the client terminal can initiate the establishment of the second secure session e.g. for resumption and/or duplication of the first secure session. This results in a faster secure session setup time.

According to one aspect of this disclosure, the credential identifier comprises a certificate fingerprint, a certificate, and/or an identifier of a pre-shared key. A certificate, a certificate fingerprint and/or an identifier of a pre-shared key provides a reliable identifier that is readily available in the transport security protocol. This disclosure takes advantage of the already deployed security infrastructure or certificate infrastructure to enable the establishment of a second secure session. This disclosure thereby provides advantages in terms of scalability.

According to one aspect of this disclosure, enabling the establishment of the second secure session comprises enabling a resumption the first secure session, and/or enabling a duplication the first secure session.

In one or more embodiments, the transport security protocol comprises a transport layer security (TLS) protocol, a secure sockets layer (SSL) protocol, a datagram transport layer security (DTLS) protocol, and/or a datagram transport layer security protocol with an extension for secure real-time transport protocol (DTLS-SRTP).

In one or more embodiments, the session establishment protocol comprises a session initiation protocol (SIP), and/or an extensible messaging and presence protocol (XMPP).

This disclosure relates to a terminal configured to act as a client terminal for enabling an establishment of a second secure session over a communication network. The second secure session is additional to a first secure session. The first secure session is established using a session establishment protocol and a transport security protocol. The terminal configured to act as a client terminal comprises processing means configured to: obtain a session identifier of the first secure session, and to obtain a credential identifier, the credential identifier identifying a server terminal of the first secure session. The processing means are configured to associate the credential identifier to the session identifier of the first secure session, and to store in a data storage the session identifier and the credential identifier associated with the session identifier of the first secure session. The processing means may comprise a processor and a memory wherein the memory is containing instructions executable by the processor. A client terminal according to this disclosure provides an advantageous session continuity, which faster and even seamlessly enables a session establishment of the second secure session.

According to one aspect of this disclosure, the processing means of the terminal configured to act as a client terminal is further configured to receive a message requesting or accepting the establishment of the second secure session, and to obtain a credential identifier from the received message. The processing means of the terminal configured to act as a client terminal is further configured to determine whether the obtained credential identifier matches the credential identifier associated with the session identifier of the first secure session, and to retrieve the session identifier of the first secure session when it is determined that the obtained credential identifier matches the credential identifier associated with the session identifier of the first secure session.

According to one aspect of this disclosure, the processing means of the terminal configured to act as a client terminal is further configured to initiate the establishment of the second secure session using the retrieved session identifier of the first secure session in an abbreviated establishment procedure of the transport security protocol when it is determined that the obtained credential identifier matches the credential identifier associated with the session identifier of the first secure session. The processing means of the terminal configured to act as a client terminal is further configured to initiate the establishment of the second secure session using a full establishment procedure of the transport security protocol when it is not determined that the obtained credential identifier matches the credential identifier associated with the session identifier of the first secure session.

This disclosure relates to a terminal configured to act as a client terminal for enabling an establishment of a second secure session over a communication network. The second secure session is additional to a first secure session. The first secure session is established using a session establishment protocol and a transport security protocol. The terminal configured to act as a client terminal comprises processing means configured to: send a message requesting or accepting the establishment of the second secure session; receive the session identifier of the first secure session; and determine whether the received session identifier matches the stored session identifier of the first secure session. The terminal configured to act as a client terminal comprises processing means configured to initiate the establishment of the second secure session using the received session identifier in an abbreviated establishment procedure of the transport security protocol, when it is determined that the received session identifier matches the stored session identifier of the first secure session; or initiate the establishment of the second secure session using a full establishment procedure of the transport security protocol, when it is not determined that the received session identifier matches the stored session identifier of the first secure session. The processing means may comprise a processor and a memory wherein the memory is containing instructions executable by the processor. This disclosure relates to a terminal configured to act as a server terminal for enabling an establishment of a second secure session over a communication network. The second secure session is additional to a first secure session. The first secure session is established using a session establishment protocol and a transport security protocol. The terminal comprises processing means configured to obtain a session identifier of the first secure session, and to obtain a credential identifier, the credential identifier identifying a client terminal of the first secure session. The processing means is configured to associate the credential identifier to the session identifier of the first secure session and to store in a data storage the session identifier and the credential identifier associated with the session identifier of the first secure session. The processing means may comprise a processor and a memory wherein the memory contains instructions executable by the processor. A server terminal according to this disclosure provides an advantageous session continuity for the client terminal, which can establish faster and even seamlessly a second secure session, as a resumption or duplication of a first secure session.

According to one aspect of this disclosure, the processing means of the terminal configured to act as a server terminal is configured to receive a message requesting or accepting the establishment of the second secure session and to obtain a credential identifier from the received message. The processing means is configured to determine whether the obtained credential identifier matches the credential identifier associated with the session identifier of the first secure session, and to retrieve the session identifier of the first secure session when it is determined that the obtained credential identifier matches the credential identifier associated with the session identifier of the first secure session. The processing means may further be configured to send to the client terminal (50) the retrieved session identifier of the first secure session when it is determined that the obtained credential identifier matches the credential identifier associated with the session identifier of the first secure session.

This disclosure relates to a computer program, comprising computer readable code which, when run on a processing means of a terminal configured to act as a client terminal, causes the terminal to perform the method as disclosed herein.

This disclosure relates to a computer program, comprising computer readable code which, when run on a processing means of a terminal configured to act as a server terminal, causes the terminal to perform the method as disclosed herein.

Advantages presented for the methods performed in any of terminals are applicable to the terminals and the computer programs.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
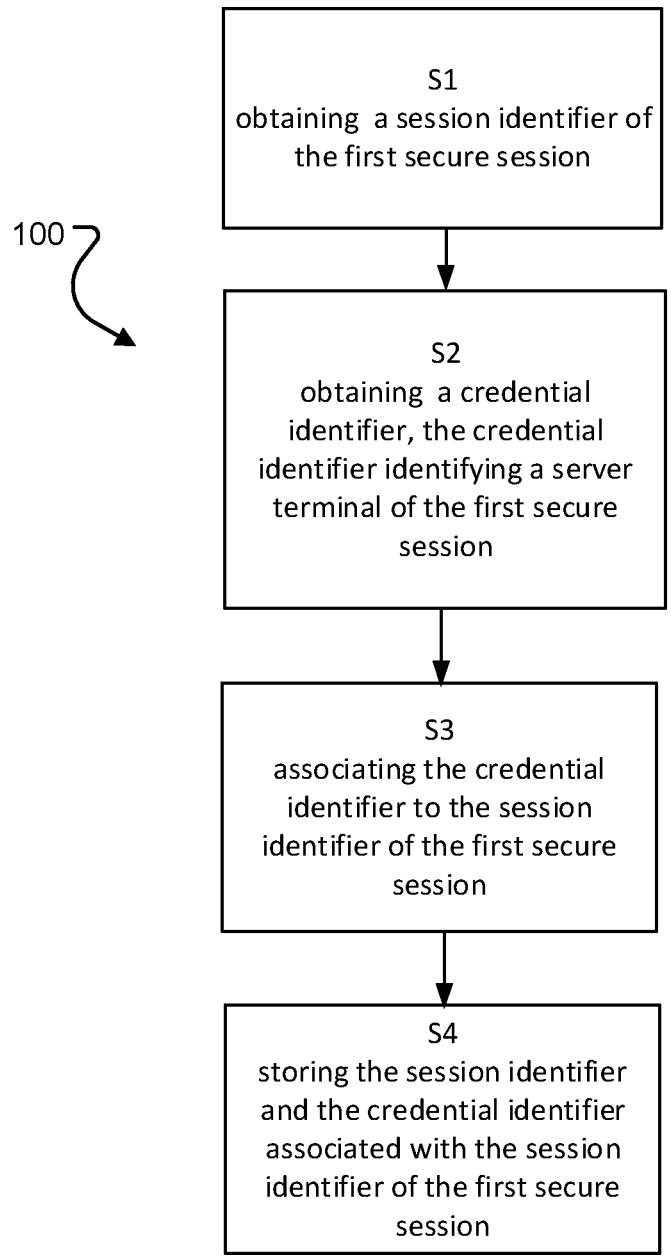
FIG. 1 is a flow chart illustrating an exemplary method, performed in a client terminal, for enabling an establishment of a second secure session according to this disclosure.

Aspects of the present disclosure will be described more fully hereinafter with reference to the accompanying drawings. The apparatuses and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards enabling an establishment of a second secure session, such as resuming or duplicating a first secure session.

The general object or idea of embodiments of the present disclosure is to address at least one or some of the disadvantages with the prior art solutions described above. The various steps described below in connection with the figures should be primarily understood in a logical sense, while each step may involve the communication of one or more specific messages depending on the implementation and protocols used.

The general idea involves to reliably identify a first secure session in order to enable an establishment of a second secure session. This disclosure proposes to use a credential identifier for this purpose, since a credential identifier is a reliable identifier for enabling an establishment of a second secure session and therefore overcomes the drawbacks mentioned earlier. This disclosure allows a client terminal to use a received credential identifier to lookup if there is an existing session information containing the credential identifier in order to establish the secure session again.

Embodiments of the present disclosure relate, in general, to the field of secure session establishment over a communication network or a communication system.

In this disclosure, the term "terminal" used herein refers to a device that has communication capabilities, memory and computational capabilities. A terminal may be a device comprising a universal integrated circuit card configured to communicate. A terminal is for example a user equipment, a network node, and/or a relay node. A terminal is for example a mobile terminal, or a fixed terminal. A terminal is configured to have ability for Internet/intranet access, web browser, organizer, calendar, a camera (e.g., video and/or still image camera), a sound recorder (e.g., a microphone), and/or global positioning system, GPS, receiver; a personal communications system (PCS) user equipment that may combine a cellular radiotelephone with data processing; a personal digital assistant, PDA that can include a radiotelephone or wireless communication system; a laptop; a camera (e.g., video and/or still image camera) having communication ability; and/or any other computation or communication device capable of transceiving, such as a personal computer, a home entertainment system, a television, etc. A terminal configured to act as a client terminal refers herein to a terminal configured to act as a client of the transport security protocol, such as a TLS client terminal. The term "client terminal" may be used to refer to a terminal configured to act as a client terminal. A server terminal refers herein to a terminal configured to act as a server of the transport security protocol, such as a TLS server terminal. The term "server terminal" may be used to refer to a terminal configured to act as a server terminal. The client-server characteristic describes the relationship of cooperating programs in an application. A server terminal provides a function or service to one or more client terminals, which initiate requests for such services. A client terminal and a server terminal exchange messages in a request-response messaging pattern: the client terminal sends e.g. a request, and the server terminal returns e.g. a response. A client terminal and a server terminal may both be a user equipment. For example, a client terminal and a server terminal are peers in a peer-to-peer system. Alternatively, a client terminal is a user equipment while a server terminal is a network node. Although the resumption feature and duplication feature are typically used for client-server protocols such as Hypertext Transfer Protocol, HTTP, it is also applied in peer-to-peer communications such as in the following scenarios:

- Two peer devices are in an instant messaging session using MSRP/TLS/TCP and one of the peer devices initiates a file transfer to the other peer device using a second MSRP/TLS/TCP connection.
- Two peer devices are in an instant messaging session using MSRP/TLS/TCP and a connection failure occurs which requires the MSRP/TLS/TCP connection to be re-established.
- Two peer devices are in a voice session using SRTP/UDP with DTLS-SRTP as the key management protocol, and decide to add video to the session. This requires a second DTLS-SRTP handshake to be performed between the peer devices.

As used herein, the term "session" refers to an information exchange between two or more communicating terminals, such as a message exchange. A session is set up or established at a certain point in time using a session establishment protocol. A session is terminated at a later point in time. A session is e.g. implemented as part of a protocol and/or a service at the application layer, at the session layer and/or at the transport layer in the OSI model. An application layer session is e.g. an HTTP session or a telnet remote login session. A session layer session is for example a Session Initiation Protocol, SIP, based call such as a phone call, a video call, and/or a multimedia call. A transport layer session is e.g. a TCP session, which can be referred to as a TCP virtual circuit, a TCP connection, or an established TCP socket or a TLS session. A session is identified by a session identifier. A session identifier is a piece of data that is used in communications with another terminal to identify a session. A session identifier may be a unique identifier and/or a uniquely derived identifier. A session is secure if the session is established using a security protocol to e.g. authenticate the end-parties, and/or to protect the confidentiality and the integrity of the messages exchanged in the session, to protect against replay-attacks. A secure session is established using a transport security protocol such as TLS, DTLS, or DTLS-SRTP.

FIG. 1 shows a flow chart illustrating an exemplary method 100, performed in a client terminal 50, for enabling an establishment of a second secure session according to this disclosure. The method 100 is performed in a terminal configured to act as a client terminal 50 for enabling an establishment of a second secure session over a communication network. The method 100 is e.g. for identifying a resumable and/or duplicable secure session. The communication network comprises a wired communication network, and/or a wireless communication network. Enabling an establishment of a second secure session over a communication network comprises enabling resumption the first secure session, and/or enabling duplication the first secure session. For example, enabling an establishment of a second secure session over a communication network comprises enabling a resumption of the first secure session, and/or enabling a duplication of the first secure session. For example, enabling an establishment of a second secure session over a communication network comprises enabling a continuation of the first secure session, enabling a reproduction of the first secure session, enabling a reopening of the first secure, and/or enabling a restoration of the first secure session. The second secure session is additional to a first secure session. For example, the second secure session is additional to an existing secure session. The second secure session is enabled to be established after the first secure session is established, either as a resumption of the first secure session or as a duplicate of the first secure session. The first secure session is established using a session establishment protocol and a transport security protocol. Enabling an establishment of a second secure session comprises enabling the establishment of the second secure session using a session establishment protocol and/or a transport security protocol. The second secure session is established consecutively to a first secure session. The second secure session and the first secure session may take place in parallel. Alternatively, the second secure session may take place after the first secure session closed.

The first secure session is established using a session establishment protocol and a transport security protocol. The establishment of the first secure session results in a session identifier of the first secure session stored at the client terminal 50. In a first step S1, a client terminal 50 obtains a session identifier of the first secure session. The step of obtaining S1 a session identifier of the first secure session comprises deriving the session identifier, retrieving the session identifier from a remote or local data storage, and/or receiving the session identifier.

In a next step S2, the client terminal 50 obtains a credential identifier, the credential identifier identifying a server terminal 60 of the first secure session. Obtaining S2 a credential identifier comprises receiving a message from e.g. a server terminal, the message comprising the credential identifier of the server terminal The establishment of the first secure session with the server terminal 60 results in a credential identifier of the server terminal 60 being received at the client terminal 50. At the end of the establishment of the first secure session, the client terminal 50 stores the credential identifier of the server terminal 60 and/or the credential of the server terminal 60. As used herein, the term "credential" refers to a cryptographic material that contributes to establishing an identity of a party to a session. A credential comprises a security credential. A credential can be self-issued or issued by a trusted third party. A credential is for example a certificate, a cryptographic key, a biometrics and/or a password. A credential is identified with a credential identifier. A credential identifier uniquely identifies a credential. A credential identifier comprises a security credential identifier. A credential identifier may comprise a certificate fingerprint, a certificate, and/or an identifier of a pre-shared key. A certificate is uniquely identified with a certificate fingerprint. A certificate fingerprint is e.g. a secure one-way hash of the DER, distinguished encoding rules, form of the certificate. A certificate fingerprint is for example X.509 certificate fingerprint. The transport security protocol comprises a transport layer security, TLS, protocol, a secure sockets layer, SSL, protocol, a datagram transport layer security, DTLS, protocol, and/or a datagram transport layer security protocol with an extension for secure real-time transport protocol, DTLS-SRTP. For example, in a TLS session, parties to the session indicate their identities by presenting authentication certificates (e.g. X.509 certificates) or pre-shared key identifiers as part of the TLS handshake procedure.

According to some aspects of this disclosure, the session establishment protocol comprises a session initiation protocol, SIP, and/or an extensible messaging and presence protocol, XMPP. In order to verify the origin and ensure the confidentiality and integrity of a media stream carried in a session, terminals may provide a certificate fingerprint. If the certificate presented for the TLS connection matches the certificate fingerprint presented in the Session Description Protocol, SDP, message, the receiving terminal can be confident that the origin of the message is indeed the initiator of the connection. A certificate fingerprint is for example represented in SDP as an attribute (an 'a' line). It consists of the name of the hash function used, followed by the hash value itself. The fingerprint attribute may be either a session-level or a media-level SDP attribute. If it is a session-level attribute, it applies to all TLS sessions for which no media-level fingerprint attribute is defined.

In step S3, the client terminal 50 associates the credential identifier to the session identifier of the first secure session. For example, the client terminal 50 links the credential identifier to the session identifier for the first session with a pointer or in a table. Associating the credential identifier to the session identifier for each session enables a possible and faster (re-) establishment, resumption, restoration and/or duplication of each session when needed.

In step S4, the client terminal 50 stores the session identifier and the credential identifier associated with the session identifier of the first secure session. The client terminal 50 stores in a local or remote data storage a data pair comprising the session identifier and the credential identifier for the first secure session. The session identifier identifies the first secure session and the credential identifier identifies the party to the session, i.e. the server terminal 60. The client terminal 50 binds together the session identifier with the identity of the server terminal involved in the first secure session. The client terminal 50 stores for example the pair (session ID, credential ID) in a cache of a memory, such as a TLS session cache. It can be considered that the session identifier is indexed by the credential identifier, and vice versa. It can be considered that the session information such as session parameters is indexed by the credential identifier. The client terminal 50 may also store the credential. Storing the credential may be necessary when there is more than one way of deriving the credential identifier, e.g. using different hash algorithms.

In an illustrative example where the disclosed technique is applied, a certificate fingerprint is used as a credential identifier to identify a resumable and/or duplicable Transport Layer Security, TLS, session, and therefore to enable an establishment of a second secure session. To establish a first TLS secured-session, a TLS Handshake Protocol is performed allowing a server terminal 60 and a client terminal 50 to authenticate each other and to negotiate an encryption algorithm and cryptographic keys before the application protocol transmits or receives a first byte of data. When a first TLS session is established between a TLS client terminal 50 and a TLS server terminal 60, the TLS client terminal 50 stores the certificate fingerprint of the TLS server terminal 60 along with the session information. When the TLS client terminal 50 establishes an additional end-to-end connection with the same TLS server terminal 60, this disclosure allows the TLS client terminal 50 to use the certificate fingerprint received in the session setup signaling to lookup if there is an existing TLS session information containing the certificate fingerprint. If a matching existing TLS session information is found by the TLS client terminal 50, the TLS client terminal 50 extracts the session identifier from the TLS session information. The TLS client terminal 50 includes the session identifier in a message of a TLS abbreviated handshake to resume or duplicate the existing TLS session. Additionally or alternatively, this disclosure allows a TLS server terminal 60, to use the certificate fingerprint received in the session setup signaling for looking up a TLS session to resume or duplicate. If such a secure session is found, the TLS server terminal 60 extracts the session identifier of the found secure session and includes the session identifier in a session signaling response to the TLS client terminal 50 that in turn may initiate an abbreviated TLS handshake to resume or duplicate the secure session.

Figure 2A:
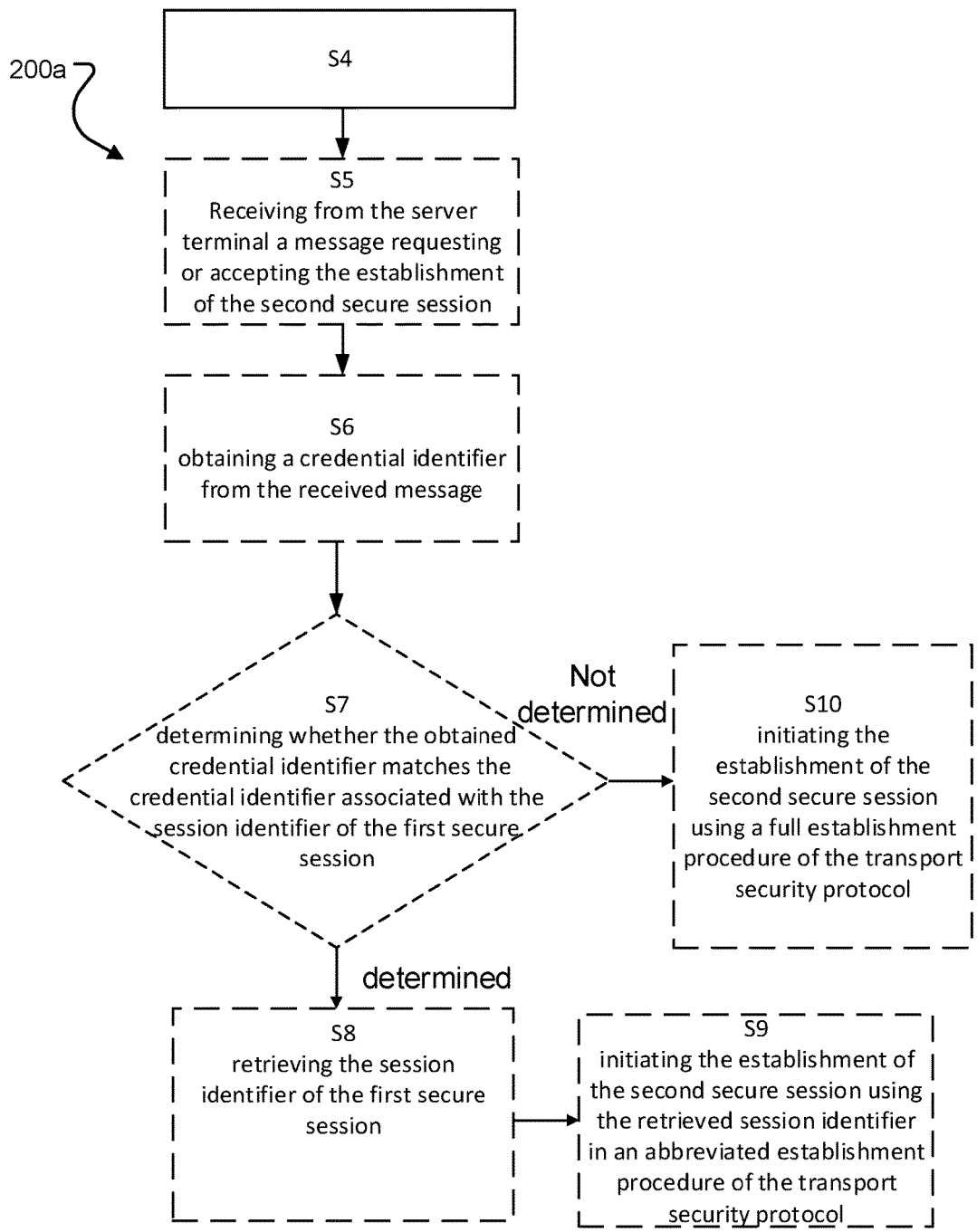
FIG. 2a is a flow chart illustrating an exemplary method, performed in a client terminal, for enabling an establishment of a second secure session according to this disclosure.

FIG. 2a shows a flow chart illustrating an exemplary method 200a, performed in a client terminal 50, for enabling an establishment of a second secure session according to this disclosure. The steps of the disclosed method 200a are consecutive to method 100 and optional.

In step S5 of method 200a, the client terminal 50 receives from the server terminal 60 a message 701 requesting or accepting the establishment of the second secure session. In an exemplary embodiment, the credential identifier is received in the session setup signaling (e.g. SIP) and is associated with the secure session information (e.g. TLS session information). Message 701 is for example a SIP message (e.g. SIP INVITE, SIP 200 OK) comprising a credential identifier. The SIP message indicates with an attribute which party to the session is to act as client terminal and server terminal in e.g. a TLS session. An attribute "a=setup-active" indicates that the sending party initiate the TCP connection, and therefore also acts as the TLS client terminal. An attribute "a=setup-passive" indicates that the sending party acts as the TLS server terminal. A terminal acting as a TLS client identifies the TLS session to establish (e.g. resume and/or duplicate) using the remote terminal's credential identifier, such as a certificate fingerprint.

In step S6, the client terminal 50 obtains a credential identifier from the received message. Obtaining S6 a credential identifier comprises e.g. obtaining from a received message a credential identifier of the server terminal 60, i.e. the sender of the received message. The client terminal 50 for example extracts the credential identifier (e.g. a certificate fingerprint) of the sender of the message, i.e. the server terminal 60. The client terminal 50 for example extracts the credential identifier from an SDP offer of a received SIP message (e.g SIP INVITE, SIP 200 OK).

In step S7, the client terminal 50 determines whether the obtained credential identifier matches the credential identifier associated with the session identifier of the first secure session. The client terminal 50 determines whether the obtained credential identifier matches the stored credential identifier of the first secure session. The client terminal 50 performs e.g. a search, through e.g. the session cache, for a credential identifier matching the obtained credential identifier.

When it is determined that the obtained credential identifier matches the credential identifier associated with the session identifier of the first secure session, the client terminal 50 retrieves in step S8 the session identifier of the first secure session, and initiates in step S9 the establishment of the second secure session using the retrieved session identifier in an abbreviated establishment procedure of the transport security protocol. If the client terminal 50 finds the matching credential identifier in the stored session information, the client terminal 50 attempts to retrieve, from e.g. the session cache, the session identifier corresponding to the obtained credential identifier. The client terminal 50 performs an abbreviated handshake of the transport security protocol such as TLS. The client terminal 50 sends to the server terminal 60 a message comprising the retrieved session identifier to initiate the abbreviated handshake. If the server terminal 60 finds the received session identifier in its session cache, the server terminal 60 proceeds with the abbreviated handshake procedure. If the server terminal 60 does not find the received session identifier in its session cache (due to e.g. a session timeout), the server terminal 60 requests to proceed with a full handshake procedure and a new secure session is created.

When it is not determined that the obtained credential identifier match the credential identifier associated with the session identifier of the first secure session, the client terminal 50 initiates in step S10 the establishment of the second secure session using a full establishment procedure of the transport security protocol. If the client terminal 50 does not find the matching credential identifier in the stored session information, the client terminal 50 initiates a full handshake and a new secure session is created.

In one or more embodiments, the method comprises associating a credential identifier with a session ticket, as defined in existing standards. Session tickets contain the session information in encrypted form and are sent together with the session identifier at a start of an abbreviated TLS handshake. This reduces the need of the TLS server to keep per-client session state.

Figure 2B:
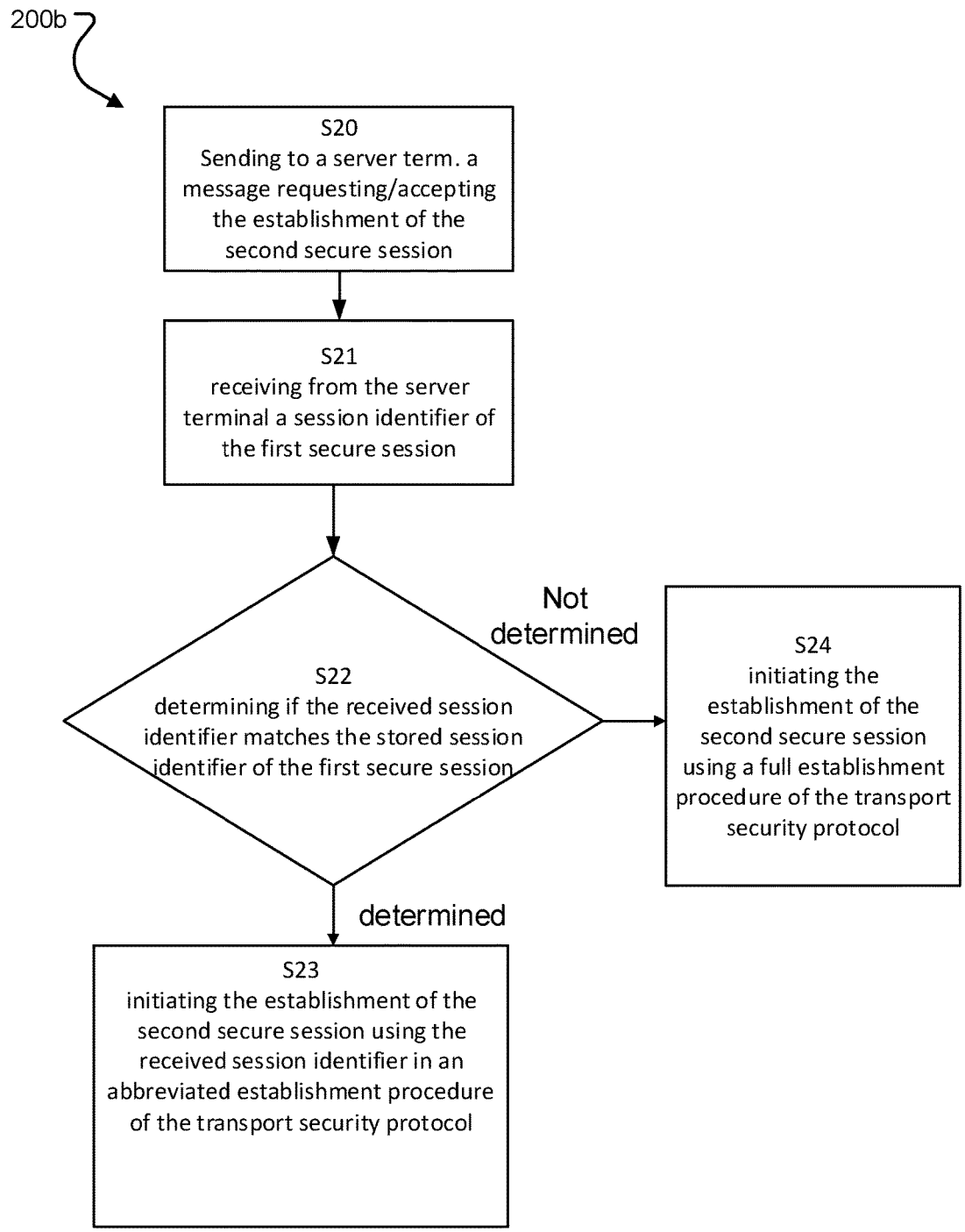
FIG. 2b is a flow chart illustrating an exemplary method, performed in a client terminal, for enabling an establishment of a second secure session according to this disclosure.

FIG. 2b is a flow chart illustrating an exemplary method 200b, performed in a client terminal. The method 200b for enabling an establishment of a second secure session illustrated in FIG. 2b takes place in a client terminal 51 when a server terminal 60 is the party that determines the session identifier for the second secure session to be established. The second secure session is additional to a first secure session. The first secure session is established between the client terminal 51 and the server terminal 60 using a session establishment protocol and a transport security protocol. The client terminal 51 sends to a server terminal 60 in step S20 a message 801 requesting or accepting the establishment of the second secure session. Message 801 comprises a credential identifier of the client terminal 51. For example, the client terminal 51 sends a SIP message (e.g SIP INVITE, SIP 200 OK, SIP ACK) comprising its credential identifier to the server terminal 60. The client terminal indicates in the SIP message that it acts as a client terminal in the transport security protocol. The server terminal 60 receiving the SIP message comprising the credential identifier of the client terminal 51 determines whether the received credential identifier matches a credential identifier associated with the session identifier of an already existing first secure session. When it is determined by the server terminal 60 that the received credential identifier matches the credential identifier associated with the session identifier of an already existing first secure session, the server terminal 60 retrieves the session identifier associated with the matching credential identifier and sends it in a response (e.g. SIP 200 OK or SIP ACK) to the client terminal 51. In Step 21, the client terminal 51 receives from the server terminal 60 the session identifier of the first secure session. For example, the client terminal 51 receives the session identifier of the first secure session in a response 802 (e.g. a SIP 200 OK, or SIP ACK) to the message requesting or accepting the establishment of the second secure session. The client terminal 51 for example extracts the session identifier from the received message 802. In Step 22, the client terminal 51 determines if the received session identifier matches the stored session identifier of the first secure session. The client terminal 51 performs for example a search through its session cache to find a stored session identifier matching the received session identifier. The client terminal 51 initiates in step S23 the establishment of the second secure session using the received session identifier in an abbreviated establishment procedure of the transport security protocol, when it is determined by the client terminal 51 that the received session identifier matches the stored session identifier of the first secure session. The client terminal 51 performs an abbreviated handshake of the transport security protocol such as TLS. The client terminal 51 sends to the server terminal 60 a message comprising the retrieved session identifier to initiate the abbreviated handshake.

In Step S24, the client terminal 51 initiates the establishment of the second secure session using a full establishment procedure of the transport security protocol, when it is not determined that the received session identifier match the stored session identifier of the first secure session. If the client terminal 51 does not find the received session identifier in the session cache (due to e.g. a session timeout), the client terminal 51 proceeds with a full handshake procedure and a new secure session is created. Optionally, the client terminal 51 may perform any of the steps of method 100 and/or any of the steps of method 200*a*. Method 200*b* may comprise any of the steps of method 100 and/or any of the steps of method 200*a*, preferably after step performing steps of method 200*b*.

Figure 3:
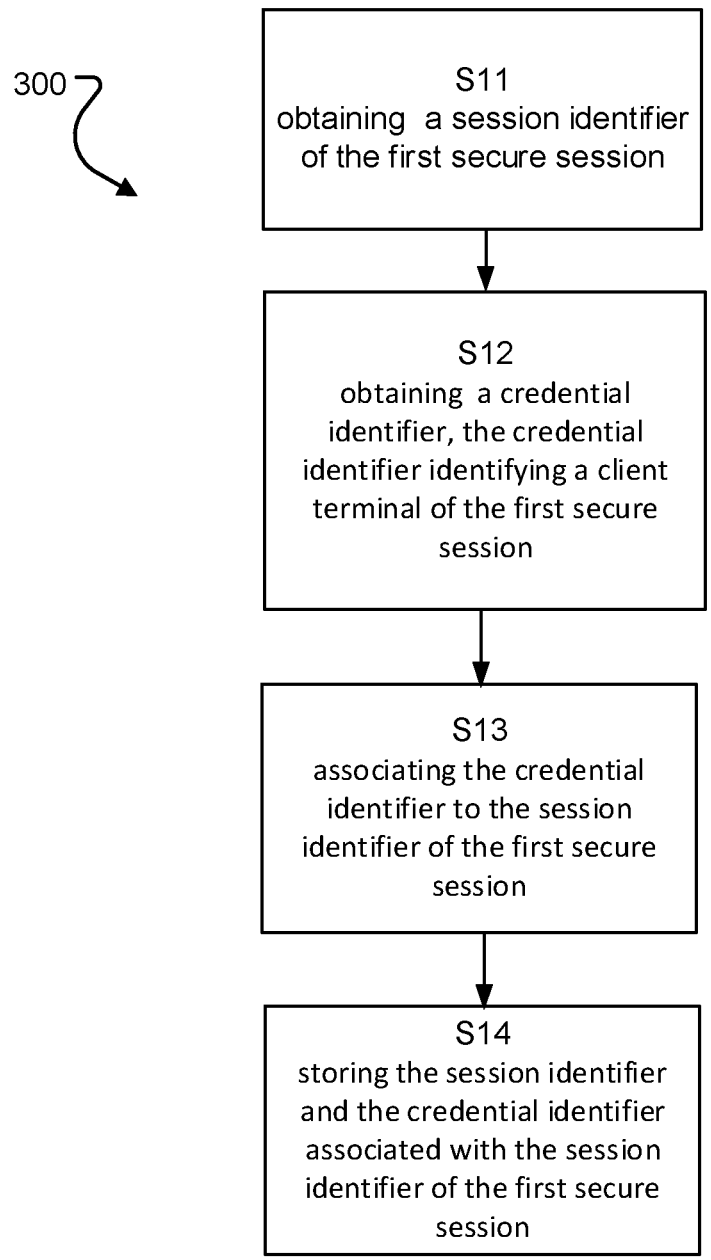
FIG. 3 is a flow chart illustrating an exemplary method, performed in a server terminal, for enabling an establishment of a second secure session according to this disclosure.

FIG. 3 shows a flow chart illustrating an exemplary method 300, performed in a server terminal 60, for enabling an establishment of a second secure session according to this disclosure. The method 300 is performed in a terminal configured to act as a server terminal 60 for enabling an establishment of a second secure session over a communication network. Enabling an establishment of a second secure session over a communication network comprises enabling a resumption of a first secure session, and/or enabling a duplication of a first secure session. The first secure session is established between the server terminal 60 and a client terminal 50, 51 using a session establishment protocol and a transport security protocol. In other words, enabling an establishment of a second secure session over a communication network comprises enabling a continuation of the first secure session, enabling a reproduction of the first secure session, enabling a reopening of the first secure, and/or enabling a restoration of the first secure session. The method 100 is e.g. for identifying a resumable or duplicable secure session. The establishment of the first secure session results in a session identifier of the first secure session stored at the server terminal 60.

In a first step S11, the server terminal 60 obtains a session identifier of the first secure session. The step S11 of obtaining a session identifier of the first secure session comprises deriving the session identifier, retrieving the session identifier from a remote or local data storage, and/or receiving the session identifier through an interface of the server terminal. Receiving the session identifier through an interface of the server terminal comprises e.g. receiving the session identifier from a client terminal.

In a step S12, the server terminal 60 obtains a credential identifier, the credential identifier identifying a client terminal 50, 51 of the first secure session. Obtaining S12 a credential identifier comprises receiving a message from e.g. a client terminal, the message comprising the credential identifier of the client terminal. The establishment of the first secure session with the server terminal 60 results a credential identifier of the client terminal 50, 51 being received at the server terminal 60. At the end of the establishment of the first secure session, the server terminal stores the credential identifier and the credential of the client terminal. The step of obtaining S12 a credential identifier comprises receiving the credential identifier from a client terminal.

In a step S13, the server terminal 60 associates the credential identifier to the session identifier of the first secure session. For example, the server terminal 60 links the credential identifier to the session identifier for the first session with a pointer or in a table. Associating the credential identifier to the session identifier for each session enables a possible and faster (re-)establishment, resumption, restoration or duplication of each session when needed.

In a step S14, the server terminal 60 stores the session identifier and the credential identifier associated with the session identifier of the first secure session. The server terminal 60 stores in a local or remote data storage a data pair comprising the session identifier and the credential identifier for the first secure session. The session identifier identifies the first secure session and the credential identifier identifies the party to the session, i.e. the client terminal 50,51. The server terminal 60 binds together the session identifier with the identity of the client terminal involved in the first secure session. For example, a TLS server terminal 60 stores the certificate fingerprint of the TLS client terminal 50 with the session information. The server terminal 60 stores for example the pair (session ID, credential ID) in a cache of a memory, such as a TLS session cache. It can be considered that the session identifier is indexed by the credential identifier, and vice versa. The server terminal 60 may also store the credential. Storing the credential may be necessary when there is more than one way of deriving the credential identifier, e.g. using different hash algorithms.

Figure 4:
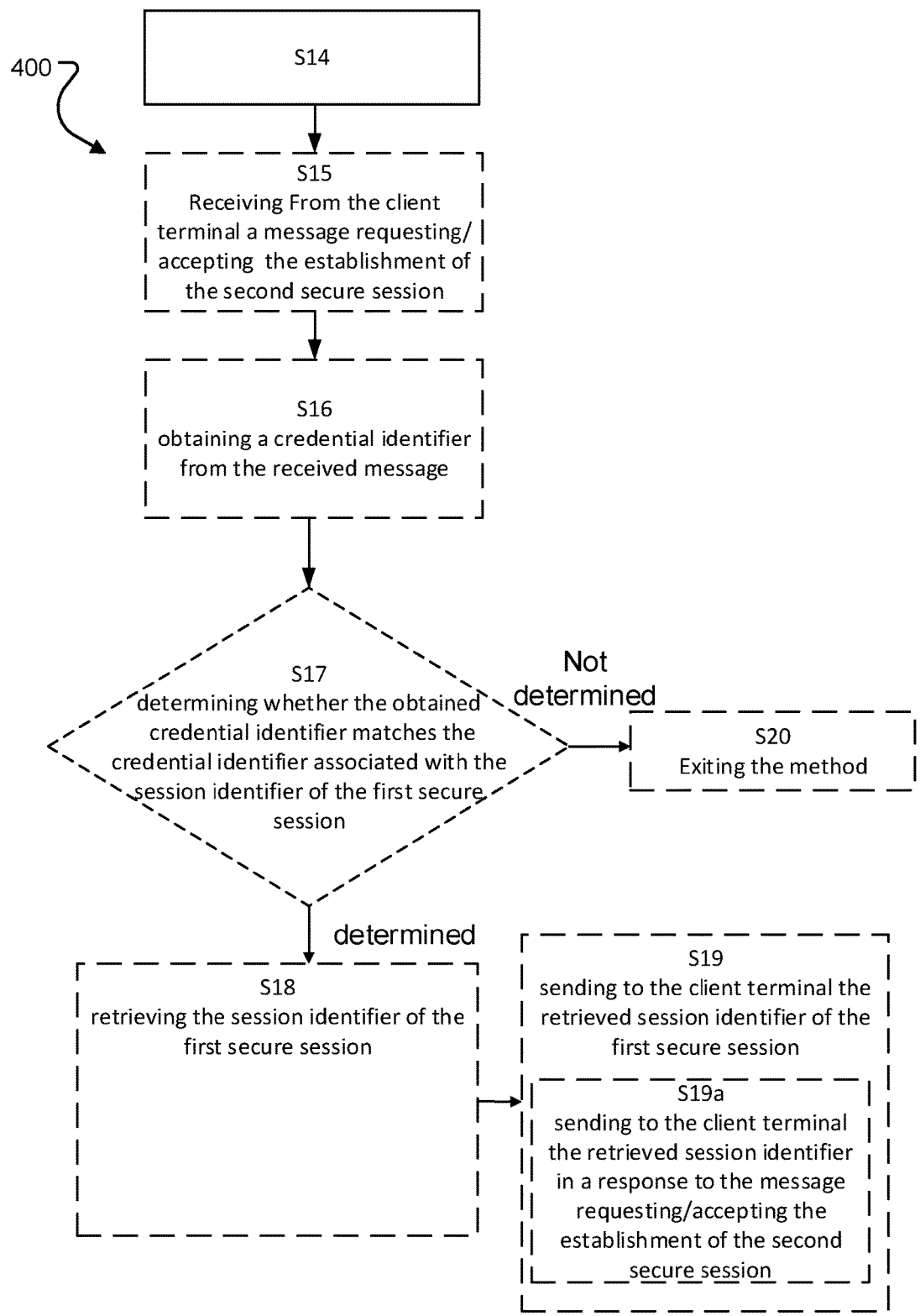
FIG. 4 is a flow chart illustrating an exemplary method, performed in a server terminal, for enabling an establishment of a second secure session according to this disclosure.

FIG. 4 shows a flow chart illustrating an exemplary method 400, performed in a server terminal 60, for enabling an establishment of a second secure session according to this disclosure. The steps illustrated in FIG. 4 are consecutive to the steps of method 300 and optional. The method 400 for enabling an establishment of a second secure session illustrated in FIG. 3 takes place in a server terminal 60 when for example a server terminal 60 is the party that can determine the session identifier for the second secure session to be established.

In a step S15, the server terminal 60 receives from the client terminal 50, 51 a message 801 requesting or accepting the establishment of the second secure session. The message requesting or accepting the establishment of the second secure session comprises a credential identifier of the client terminal 50, 51. In an exemplary embodiment, the credential identifier is received in the session setup signaling (e.g. SIP) and is associated with the secure session information (e.g. TLS session information). Message 801 is for example a SIP message (e.g. SIP INVITE, SIP 200 OK, SIP ACK) comprising a credential identifier of the client terminal. The SIP message indicates with an attribute which party to the session is to act as client terminal and server terminal in a session in e.g. a TLS session. An attribute "a=setup-passive" indicates that the sending party is not to initiate the TCP connection, and therefore also acts as the TLS server terminal. A terminal acting as a TLS server identifies the TLS session to establish (e.g. resume and/or duplicate) using the remote terminal's credential identifier, such as a certificate fingerprint of the TLS client.

In a step S16, the server terminal 60 obtains a credential identifier from the received message. Obtaining S16 a credential identifier comprises e.g. obtaining a credential identifier of a sender of the received message. The server terminal 60 for example extracts the credential identifier (e.g. the certificate fingerprint) of the sender of the message, i.e. the client terminal 50. The server terminal 60 for example extracts the credential identifier from an SDP offer of a received SIP message (e.g. SIP INVITE, SIP 200 OK, SIP ACK).

In step S17, the server terminal 60 determines whether the obtained credential identifier matches the credential identifier associated with the session identifier of the first secure session. The server terminal 60 determines whether the obtained credential identifier matches the stored credential identifier of the first secure session. The server terminal 60 performs e.g. a search, through e.g. the session cache, for a credential identifier matching the obtained credential identifier.

When it is determined that the obtained credential identifier matches the credential identifier associated with the session identifier of the first secure session, the server terminal 60 retrieves in step S18 the session identifier of the first secure session, and sends in step S19 to the client terminal 50, 51 the retrieved session identifier of the first secure session. If the server terminal 60 finds the matching credential identifier in the stored session information, the server terminal 60 attempts to retrieve, from e.g. the session cache, the session identifier corresponding to the obtained credential identifier. The server terminal 60 sends the retrieved session identifier to the client terminal 50, 51 that in turn initiates an abbreviated handshake of the transport security protocol such as TLS. For example, the server terminal 60 sends to the client terminal 60 in step S19a the retrieved session identifier in a response 802 to the message 801 requesting or accepting the establishment of the second secure session, such as SIP 200 OK response, SIP ACK.

When it is not determined that the obtained credential identifier matches a credential identifier associated with the session identifier of the first secure session, the server terminal 60 exits the method 400 and awaits for the client terminal to initiate a full establishment procedure.

Figure 5A:
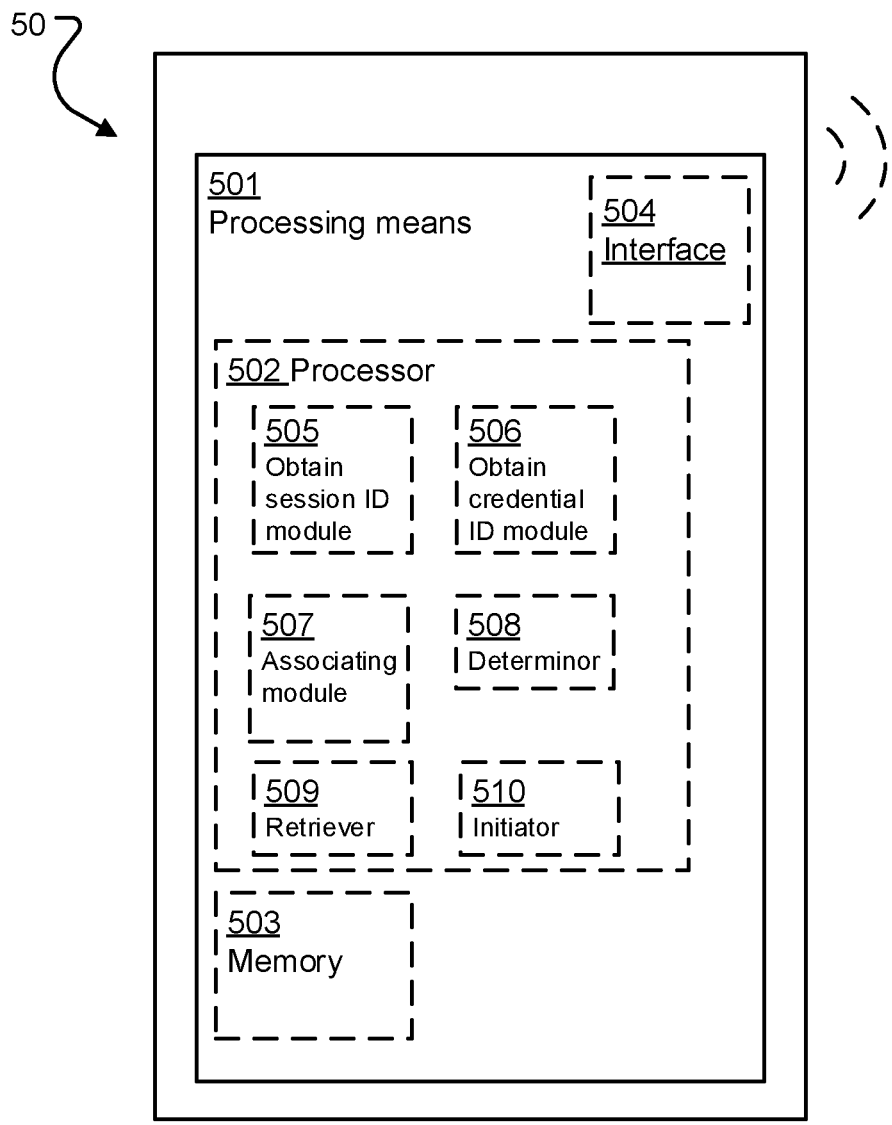
FIG. 5a is a block diagram illustrating an exemplary terminal configured to act as a client terminal for enabling an establishment of a second secure session over a communication network according to this disclosure.

FIG. 5a shows a block diagram illustrating an exemplary terminal 50 configured to act as a client terminal for enabling an establishment of a second secure session over a communication network according to this disclosure. The terminal 50 is configured to act as client terminal, such as a TLS client terminal. The client terminal 50 is configured to enable an establishment of a second secure session over a communication network. The second secure session is additional and/or consecutive to a first secure session, the first secure session being established using a session establishment protocol and a transport security protocol. The terminal 50 comprises processing means 501 configured to obtain a session identifier of the first secure session. Therefore the processing means 501 may comprise an obtain session identifier module 505. The processing means 501 is configured to obtain a credential identifier, the credential identifier identifying a server terminal 60 of the first secure session. Hence the processing means 501 comprises e.g. an obtain credential identifier module 506 configured to obtain a credential identifier. The processing means 501 is configured to associate the credential identifier to the session identifier of the first secure session. Hence the processing means 501 comprises e.g. an associating module 507 configured to associate the credential identifier to the session identifier of the first secure session. The processing means 501 is configured to store in a data storage the session identifier and the credential identifier associated with the session identifier of the first secure session. Hence the processing means 501 may comprise a memory 503 to store the session identifier and the credential identifier associated with the session identifier of the first secure session. The processing means 501 is for example configured to receive a message requesting or accepting the establishment of the second secure session. Hence the processing means 501 may comprise an interface 504 configured to receive a message requesting or accepting the establishment of the second secure session, such as a message from the server terminal 60. The interface 504 is configured for wired communication and/or for wireless communication. The processing means 501 is for example configured to obtain a credential identifier from the received message. For example, the obtain credential identifier module 506 is configured to obtain a credential identifier from the received message. The processing means 501 is for example configured to determine whether the obtained credential identifier matches the credential identifier associated with the session identifier of the first secure session. Hence the processing means 501 may comprise a determinor 508 to determine whether the obtained credential identifier matches the credential identifier associated with the session identifier of the first secure session. The processing means 501 is for example configured to retrieve the session identifier of the first secure session when it is determined that the obtained credential identifier matches the credential identifier associated with the session identifier of the first secure session. Hence the processing means 501 may comprise a retriever 509 configured to retrieve the session identifier of the first secure session. The processing means 501 is configured to initiate the establishment of the second secure session using the retrieved session identifier of the first secure session in an abbreviated establishment procedure of the transport security protocol when it is determined that the obtained credential identifier matches the credential identifier associated with the session identifier of the first secure session. The processing means 501 is configured to initiate the establishment of the second secure session using a full establishment procedure of the transport security protocol when it is not determined that the obtained credential identifier matches the credential identifier associated with the session identifier of the first secure session. Therefore, the processing means 501 may comprise an initiator 510 adapted to initiate a full handshake or an abbreviated handshake of a transport security protocol.

In one or more embodiments, the terminal 50 is configured to act as client terminal for enabling an establishment of a second secure session over a communication network is configured to obtain a session identifier of the first secure session. Therefore the terminal 50 may comprise an obtain session identifier module 505. The terminal 50 is configured to obtain a credential identifier, the credential identifier identifying a server terminal 60 of the first secure session. Hence the terminal 50 comprises e.g. an obtain credential identifier module 506 configured to obtain a credential identifier. The terminal 50 is configured to associate the credential identifier to the session identifier of the first secure session. Hence the terminal 50 comprises e.g. an associating module 507 configured to associate the credential identifier to the session identifier of the first secure session. The terminal 50 is configured to store in a data storage the session identifier and the credential identifier associated with the session identifier of the first secure session. Hence the terminal 50 may comprise a memory 503 to store the session identifier and the credential identifier associated with the session identifier of the first secure session. The terminal 50 is for example configured to receive a message requesting or accepting the establishment of the second secure session. Hence the terminal 50 may comprise an interface 504 configured to receive a message requesting the establishment of the second secure session. The interface 504 is configured for wired communication and/or for wireless communication. The terminal 50 is for example configured to obtain a credential identifier from the received message. For example, the obtain credential identifier module 506 is configured to obtain a credential identifier from the received message. The terminal 50 is for example configured to determine whether the obtained credential identifier matches the credential identifier associated with the session identifier of the first secure session. Hence the terminal 50 may comprise a determiner 508 to determine whether the obtained credential identifier matches the credential identifier associated with the session identifier of the first secure session. The terminal 50 is for example configured to retrieve the session identifier of the first secure session when it is determined that the obtained credential identifier matches the credential identifier associated with the session identifier of the first secure session. Hence the terminal 50 may comprise a retriever 509 configured to retrieve the session identifier of the first secure session.

In one or more embodiments, the processing means comprise a processor 502 and a memory 503 wherein the memory 503 contains instructions executable by the processor 502. The processor 502 may be constituted by any suitable Central Processing Unit, CPU, microcontroller, Digital Signal Processor, DSP, etc. capable of executing computer program code. According to some aspects, the disclosure relates to a client terminal comprising a processor 301 and a memory, said memory containing instructions executable by said processor, to execute the method disclosed herein. The memory 503 may be any suitable type of computer readable memory and may be of volatile and/or non-volatile type. The processor 502 is for example configured to obtain a session identifier of the first secure session. The processor 502 comprises e.g. an obtain session identifier module 505. The processor 502 is configured to obtain a credential identifier, the credential identifier identifying a server terminal 60 of the first secure session. Hence processor 502 comprises e.g. an obtain credential identifier module 506. The processor 502 is configured to associate the credential identifier to the session identifier of the first secure session. Hence the processor 502 comprises e.g. an associating module 507. The processor 502 is configured to store in a data storage the session identifier and the credential identifier associated with the session identifier of the first secure session. Hence the processor 502 comprises e.g. a memory 503 to store the session identifier and the credential identifier associated with the session identifier of the first secure session. The processor 502 is for example configured to receive a message requesting or accepting the establishment of the second secure session. Hence the processor 502 may comprise an interface 504 configured to receive a message requesting or accepting the establishment of the second secure session. The processor 502 is for example configured to obtain a credential identifier from the received message. The processor 502 is for example configured to determine whether the obtained credential identifier matches the credential identifier associated with the session identifier of the first secure session. Hence processor 502 may comprise a determiner 508 to determine whether the obtained credential identifier matches the credential identifier associated with the session identifier of the first secure session. The processor 502 is for example configured to retrieve the session identifier of the first secure session when it is determined that the obtained credential identifier matches the credential identifier associated with the session identifier of the first secure session. Hence the processor 502 may comprise a retriever 509 configured to retrieve the session identifier of the first secure session. The processor 502 is configured to initiate the establishment of the second secure session using the retrieved session identifier of the first secure session in an abbreviated establishment procedure of the transport security protocol when it is determined that the obtained credential identifier matches the credential identifier associated with the session identifier of the first secure session. The processor 502 is configured to initiate the establishment of the second secure session using a full establishment procedure of the transport security protocol when it is not determined that the obtained credential identifier matches the credential identifier associated with the session identifier of the first secure session. Therefore, the processor 502 may comprise an initiator 510 adapted to initiate a full handshake or an abbreviated handshake of a transport security protocol.

Figure 5B:
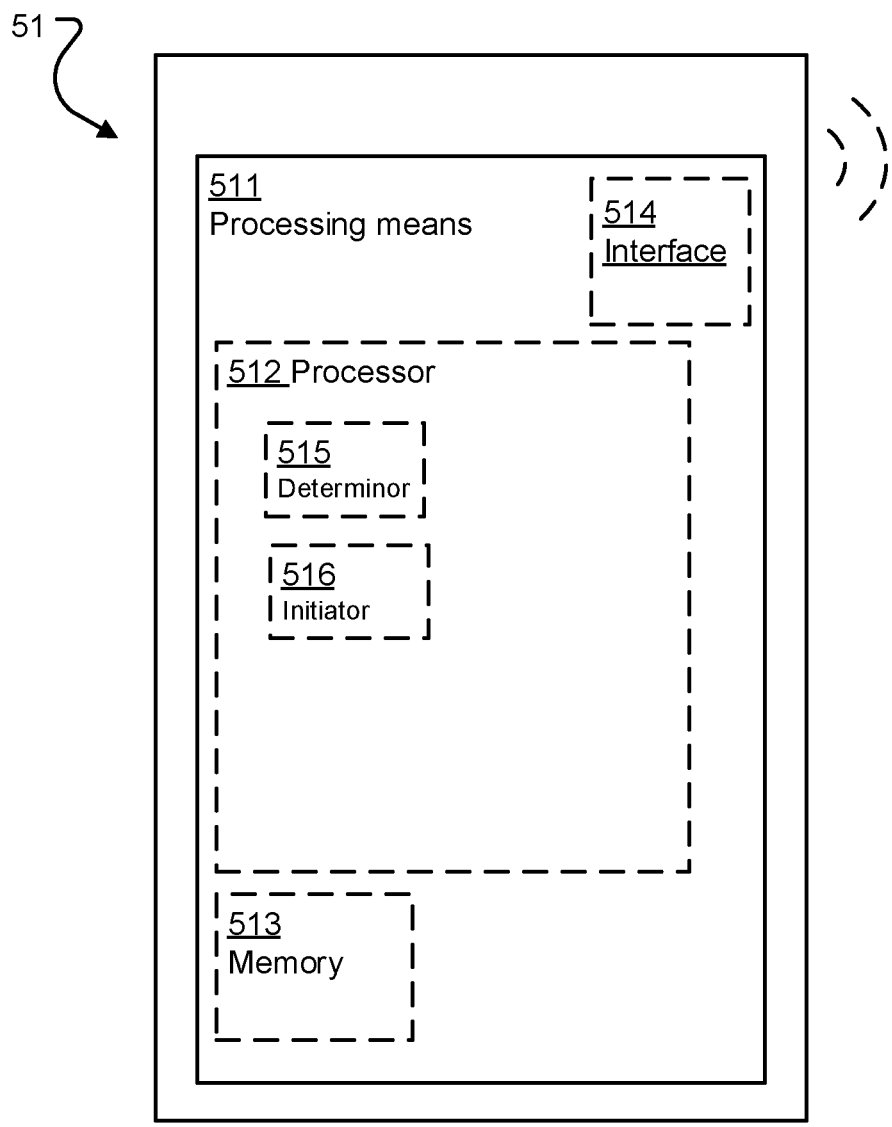
FIG. 5b is a block diagram illustrating another exemplary terminal configured to act as a client terminal for enabling an establishment of a second secure session over a communication network according to this disclosure.

FIG. 5b shows a block diagram illustrating an exemplary terminal 51 configured to act as a client terminal for enabling an establishment of a second secure session over a communication network according to this disclosure. FIG. 5b shows a block diagram illustrating an exemplary client terminal 51 when a server terminal 60 is the party that can determine the session identifier for the second secure session to be initiated by the client terminal 51. The client terminal 51 comprises processing means 511 configured to send to a server terminal 60 a message 801 requesting or accepting the establishment of the second secure session, and to receive from the server terminal 60 the session identifier of the first secure session. Hence the processing means 511 comprises e.g. an interface 514 for sending and receiving messages. The processing means 511 is further configured to determine if the received session identifier matches the stored session identifier of the first secure session. Hence a determinor 515 is further configured to determine if the received session identifier matches the stored session identifier of the first secure session. The processing means 511 is further configured to initiate the establishment of the second secure session using the received session identifier in an abbreviated establishment procedure of the transport security protocol, when it is determined that the received session identifier matches the stored session identifier of the first secure session. Hence, if the determinor 515 determines that the received session identifier matches the stored session identifier of the first secure session, the initiator 516 may initiate an abbreviated establishment procedure of the transport security protocol, such as an abbreviated handshake. If the determinor 515 does not determine that the received session identifier matches the stored session identifier of the first secure session, the initiator 516 initiates the establishment of the second secure session using a full establishment procedure of the transport security protocol. Optionally, the client terminal 51 may be configured to perform any of the steps of method 100 and/or method 200*a*. Therefore, the terminal 51 may further comprise an obtain session ID module, a obtain credential ID module, an associating module, and/or a retriever module.

In one or more embodiments, the processing means 511 comprise a processor 512 and a memory 513. The processor 512 is further configured to send a message 801 requesting or accepting the establishment of the second secure session; and to receive the session identifier of the first secure session via interface 514. The processor 512 is further configured to determine if the received session identifier matches the stored session identifier of the first secure session. Hence, the processor 514 comprises e.g. a determinor 515. The processor 512 is further configured to initiate the establishment of the second secure session using the received session identifier in an abbreviated establishment procedure of the transport security protocol, when it is determined that the received session identifier matches the stored session identifier of the first secure session. Hence, the processor 514 comprises e.g. an initiator 516. Additionally, the processor 512 may further comprise an obtain session ID module, a obtain credential ID module, an associating module, and/or a retriever module.

In one or more embodiments, the client terminal 50, 51 is a TLS client terminal comprising a SIP client and a TLS module. The SIP client of terminal 50, 51 sends the credential identifier of the TLS server (e.g. a certificate fingerprint of the TLS server) to the TLS module. The TLS module checks if a TLS session associated with the credential identifier exists in the TLS session cache, and if that is the case it attempts to establish (e.g. resume and/or duplicate) that session. Otherwise the TLS module creates a new session and stores it in the session cache together with the newly obtained credential.

Figure 6:
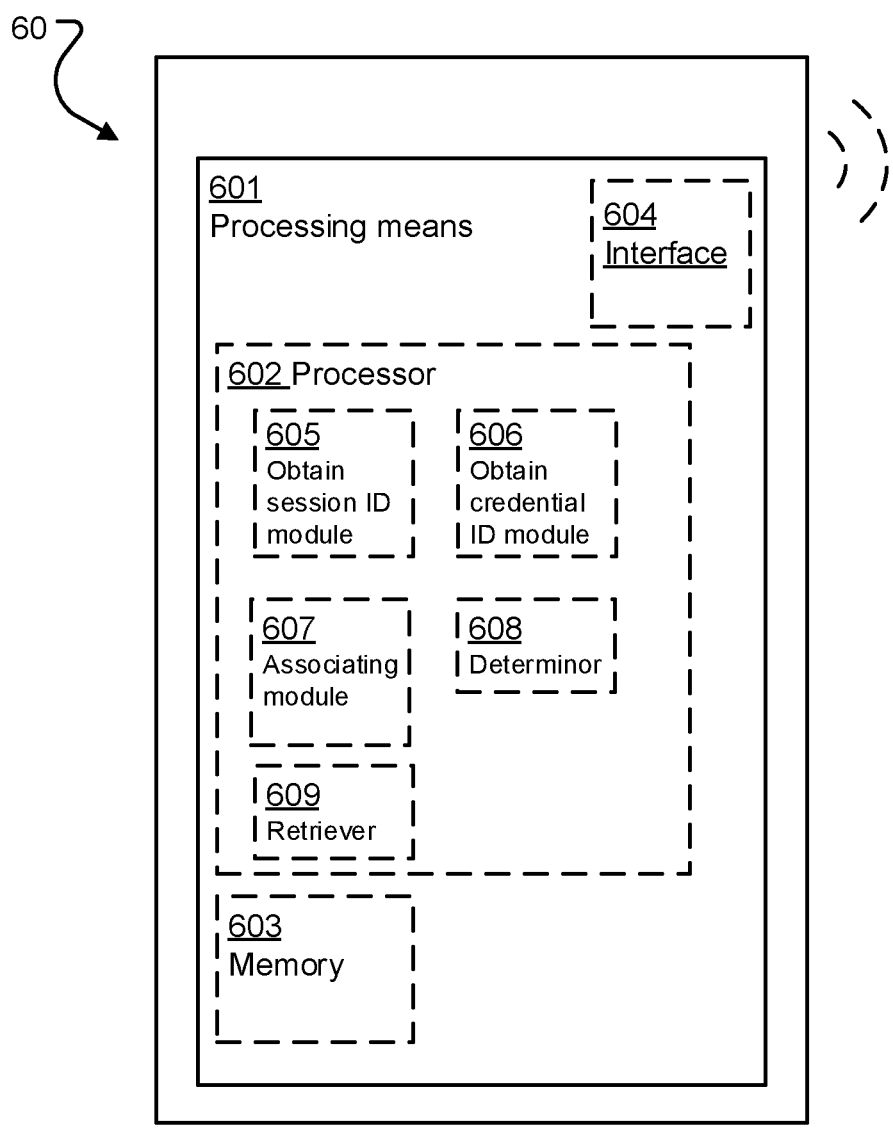
FIG. 6 is a block diagram illustrating an exemplary terminal configured to act as a server terminal for enabling an establishment of a second secure session over a communication network according to this disclosure.

FIG. 6 shows a block diagram illustrating an exemplary terminal 60 configured to act as a server terminal 60 for enabling an establishment of a second secure session over a communication network according to this disclosure. The terminal 60 is configured to act as server terminal, such as a TLS server terminal. The server terminal 60 is configured to enable an establishment of a second secure session over a communication network. The second secure session is additional or consecutive to a first secure session, the first secure session being established using a session establishment protocol and a transport security protocol. The terminal 60 comprises processing means 601 configured to obtain a session identifier of the first secure session. Therefore the processing means 601 may comprise an obtain session identifier module 605. The processing means 601 is configured to obtain a credential identifier, the credential identifier identifying a server terminal 60 of the first secure session. Hence the processing means 601 may comprise an obtain credential identifier module 606 configured to obtain a credential identifier. The processing means 601 is configured to associate the credential identifier to the session identifier of the first secure session. Hence the processing means 601 may comprise an associating module 607 configured to associate the credential identifier to the session identifier of the first secure session. The processing means 601 is configured to store in a data storage the session identifier and the credential identifier associated with the session identifier of the first secure session. Hence the processing means 601 may comprise a memory 603 to store the session identifier and the credential identifier associated with the session identifier of the first secure session. The processing means 601 is for example configured to receive a message requesting or accepting the establishment of the second secure session. Hence the processing means 601 may comprise an interface 604 configured to receive a message requesting or accepting the establishment of the second secure session, such as a message from a client terminal 50, 51. The interface 604 is configured for wired communication and/or for wireless communication. The processing means 601 is for example configured to obtain a credential identifier from the received message. The processing means 601 is for example configured to determine whether the obtained credential identifier matches the credential identifier associated with the session identifier of the first secure session. Hence the processing means 601 comprises e.g. a determinor 608 to determine whether the obtained credential identifier matches the credential identifier associated with the session identifier of the first secure session. The processing means 601 is for example configured to retrieve the session identifier of the first secure session when it is determined that the obtained credential identifier matches the credential identifier associated with the session identifier of the first secure session. Hence the processing means 601 comprises e.g. a retriever 609 configured to retrieve the session identifier of the first secure session. The processing means 601 is e.g. further configured to send to the client terminal 50 the retrieved session identifier of the first secure session when it is determined that the obtained credential identifier matches the credential identifier associated with the session identifier of the first secure session. The interface 604 is e.g. further configured to send the retrieved session identifier of the first secure session.

In one or more embodiments, the terminal 60 configured to act as a server terminal is configured to obtain a session identifier of the first secure session. Therefore the terminal 60 may comprise an obtain session identifier module 605. The terminal 60 is configured to obtain a credential identifier, the credential identifier identifying a client terminal 50, 51 of the first secure session. Hence the terminal 60 may comprise an obtain credential identifier module 606 configured to obtain a credential identifier. The terminal 60 is configured to associate the credential identifier to the session identifier of the first secure session. Hence the terminal 60 may comprise an associating module 607 configured to associate the credential identifier to the session identifier of the first secure session. The terminal 60 is configured to store in a data storage the session identifier and the credential identifier associated with the session identifier of the first secure session. Hence the terminal 60 may comprise a memory 603 to store the session identifier and the credential identifier associated with the session identifier of the first secure session. The terminal 60 is for example configured to receive a message requesting or accepting the establishment of the second secure session. Hence the terminal 60 may comprise an interface 604 configured to receive a message requesting or accepting the establishment of the second secure session, such as a message 801 from the client terminal 50, 51. The interface 604 is configured for wired communication and/or for wireless communication. The terminal 60 is for example configured to obtain a credential identifier from the received message. The terminal 60 is for example configured to determine whether the obtained credential identifier matches the credential identifier associated with the session identifier of the first secure session. Hence the terminal 60 comprises e.g. a determinor 608 to determine whether the obtained credential identifier matches the credential identifier associated with the session identifier of the first secure session. The terminal 60 is for example configured to retrieve the session identifier of the first secure session when it is determined that the obtained credential identifier matches the credential identifier associated with the session identifier of the first secure session. Hence the terminal 60 comprises e.g. a retriever 609 configured to retrieve the session identifier of the first secure session. The terminal 60 is e.g. further configured to send to the client terminal 50 the retrieved session identifier of the first secure session when it is determined that the obtained credential identifier matches the credential identifier associated with the session identifier of the first secure session. The interface 604 is e.g. further configured to send the retrieved session identifier of the first secure session.

In one or more embodiments, the processing means comprise a processor 602 and a memory 603 wherein the memory 603 contains instructions executable by the processor 602. The processor 602 may be constituted by any suitable Central Processing Unit, CPU, microcontroller, Digital Signal Processor, DSP, field programmable gate array, FPGA, or application specific integrated circuit, ASIC or any other form of processor etc. capable of executing computer program code. According to some aspects, the disclosure relates to a client terminal comprising a processor 301 and a memory, said memory containing instructions executable by said processor, to execute the method disclosed herein. The memory 603 may be configured to store received or transmitted data and/or executable program instructions. The memory 603 may be any suitable type of computer readable memory and may be of volatile and/or non-volatile type. The processor 602 is for example configured to obtain a session identifier of the first secure session. The processor 602 comprises e.g. an obtain session identifier module 605. The processor 602 is configured to obtain a credential identifier, the credential identifier identifying a client terminal 50, 51 of the first secure session. Hence processor 602 comprises e.g. an obtain credential identifier module 606. The processor 602 is configured to associate the credential identifier to the session identifier of the first secure session. Hence the processor 602 comprises e.g. an associating module 607. The processor 602 is configured to store in a data storage the session identifier and the credential identifier associated with the session identifier of the first secure session. Hence the processor 602 comprises e.g. a memory 603 to store the session identifier and the credential identifier associated with the session identifier of the first secure session. The processor 602 is for example configured to receive a message requesting or accepting the establishment of the second secure session. Hence the processor 602 may comprise an interface 604 configured to receive a message requesting or accepting the establishment of the second secure session, such as a message 801 from the client terminal 50, 51. The processor 602 is for example configured to obtain a credential identifier from the received message. The processor 602 is for example configured to determine whether the obtained credential identifier matches the credential identifier associated with the session identifier of the first secure session. Hence processor 602 may comprise a determiner 608 to determine whether the obtained credential identifier matches the credential identifier associated with the session identifier of the first secure session. The processor 602 is for example configured to retrieve the session identifier of the first secure session when it is determined that the obtained credential identifier matches the credential identifier associated with the session identifier of the first secure session. Hence the processor 602 may comprise a retriever 609 configured to retrieve the session identifier of the first secure session.

In one or more embodiments, the server terminal 60 is a TLS server terminal comprising a SIP client and a TLS module. The SIP client of terminal 60 sends the credential identifier of the TLS client (e.g. a certificate fingerprint of the TLS client) to the TLS module. The TLS module checks if a TLS session associated with the credential identifier exists in the TLS session cache, and if that is the case it returns the TLS session identifier to the SIP client that includes it in the SIP message sent to the TLS client terminal 50. Once the client terminal 50 initiates the TLS handshake, the SIP client in the TLS server terminal 60 extracts the TLS session identifier and sends it to the TLS module which attempts to proceed with the requested establishment, resumption and/or duplication of the session. If no TLS session identifier is found corresponding to the received session identifier, a new session is created with a full handshake. The TLS server terminal 60 stores a new session in the session cache together with the credential (e.g. certificate) of the TLS client.

Figure 7:
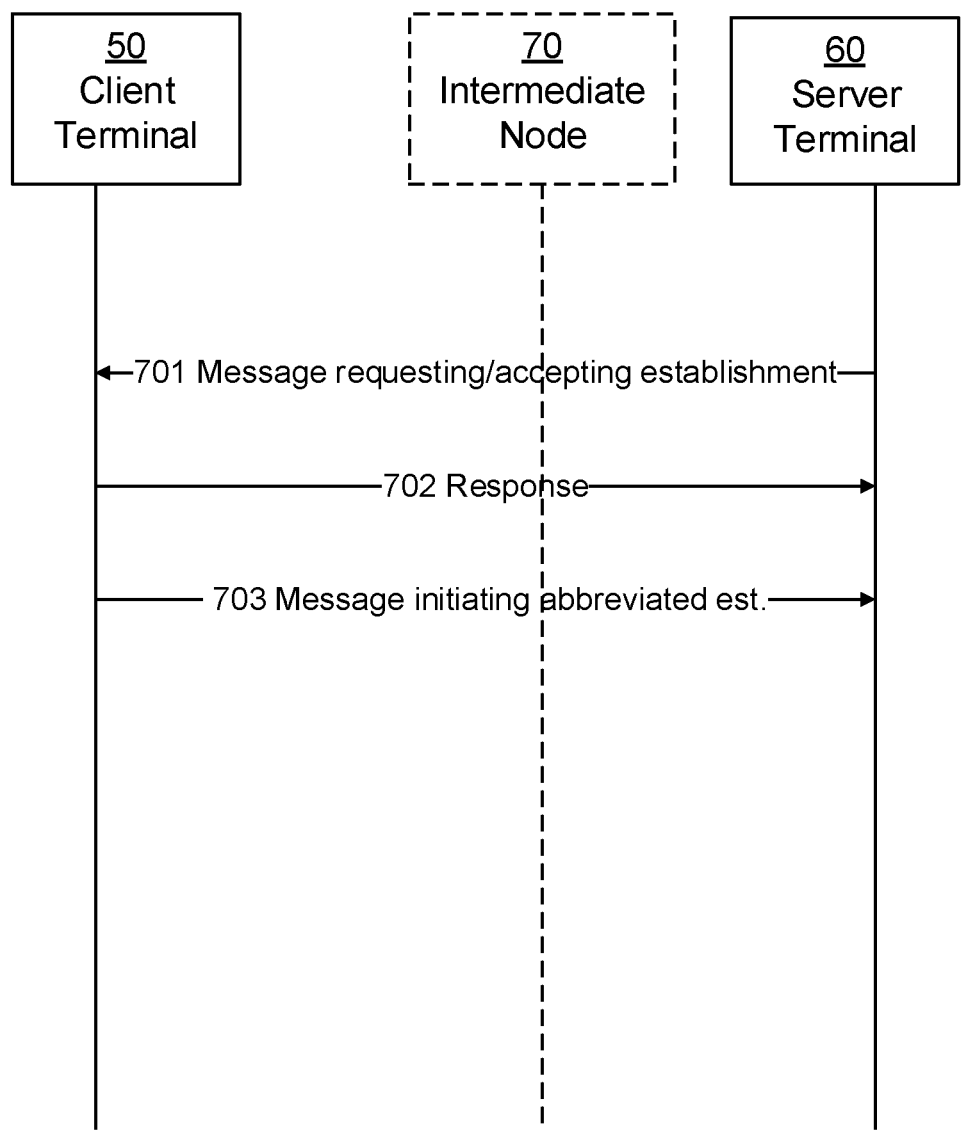
FIG. 7 is a signaling diagram illustrating an exemplary exchange of messages for establishing a second secure session according to this disclosure in an embodiment of a communication network.

FIG. 7 shows a signaling diagram illustrating an exemplary exchange of messages for establishing a second secure session according to this disclosure in an embodiment of a communication network. The signaling diagram shows a client terminal 50 and a server terminal 60. The server terminal 60 sends a message 701 requesting or accepting establishment of a second secure session to the client terminal 50, the second secure session being additional and/or consecutive to a first secure session. The message 701 comprises a credential identifier of the server terminal 60. For example, the server terminal 60 sends to the client terminal 50 a signaling message to establish a media session. For example, the server terminal 60 sends a SIP INVITE to the client terminal 50 to establish a TLS protected session, such as fax transmission. The SIP INVITE comprises a credential identifier of the server terminal 60, such as an identifier of a certificate, such as a certificate fingerprint of the server terminal 60. The signaling diagram is similar in case of an outgoing call, and if DTLS or DTLS-SRTP is used as a transport security protocol to protect the media. If the client terminal 50 accepts to establish the second secure session, the client terminal 50 sends back to the server terminal a response 702. The response 702 comprises for example an indication that the client terminal 50 is to act or continue to act as a client terminal in the initiation phase of the transport security protocol. For example, the client terminal 50 responds with a SIP 200 OK comprising an SDP answer and an attribute "a=setup-active" indicating to the server terminal 60 that the client terminal 50 is to initiate the TCP connection, and, as a consequence, that it acts as a TLS client terminal in the TLS handshake. The client terminal 50 receiving the message 701 extracts the credential identifier of the server terminal from message 701. The client terminal 50 determines whether the extracted credential identifier matches a credential identifier associated with the session identifier of an earlier established session, such as the first secure session. For example, the client terminal 50 determines if the received credential identifier corresponds to a credential identifier stored in the TLS session cache with a session identifier of an earlier established session. When it is determined that the received credential identifier matches the credential identifier associated with the session identifier of the earlier established session, such as the first secure session, the client terminal 50 retrieves the session identifier of the earlier established session and initiates using the retrieved session identifier an abbreviated establishment procedure of the transport security protocol with message 703. When it is determined that the received credential identifier matches the credential identifier associated with the session identifier of the earlier established session, such as the first secure session, the client terminal 50 performs a full establishment procedure of the transport security protocol. For example, the client terminal 50 attempts to resume or duplicate a secure session by including the TLS session identifier in the initial TLS handshake message. If the server terminal 60 does not agree to resume or duplicate the secure session or if no associated TLS session identifier at the client terminal 50 was found, then a full TLS handshake is performed and a new TLS session is created. The client terminal 50 stores the new session information in the session cache together with the credential or the credential identifier, such as the certificate or certificate fingerprint of the TLS server terminal. Storing the certificate instead of the certificate fingerprint is necessary when there is more than one way of calculating the certificate fingerprint, e.g. using different hash algorithms.

In one or more embodiments, the message 701 and the message 702 traverse one or more intermediate nodes 70. According to an aspect of the disclosure, the one or more intermediate nodes inserts a media gateway that encrypts and decrypts the method by replacing the credential identifier of the server terminal 60 with the credential identifier of intermediate node. This results in the second secure session being established between the client terminal 50 and the intermediate node 70, and another secure session being established between the intermediate node 70 and the server terminal 60. In such a scenario, the intermediate node 70 acts as a server terminal in the transport security protocol for the second secure session towards the client terminal 50 and acts a client terminal in the transport security protocol for the other secure session towards the server terminal 60. For example, the SIP INVITE and SIP 200 OK traverse one or more signaling proxies on its way to other endpoint. Each of these proxies may insert a media gateway that encrypts and decrypts the media (for example, to perform transcoding) by replacing the certificate fingerprint and possibly (IP, port) in the message with the certificate fingerprint and possibly (IP, port) of the media gateway. The TLS connections are thus established e.g. between the client terminal 50 and the media gateway and between the media gateway and the server terminal 60. In other words, two or more separate sessions are established where the signaling proxy or media gateway takes the role of client terminal when it interacts with a server terminal and takes the role of a server terminal when it interacts with the client terminal. The intermediate node 70 when acting as a client terminal is configured to obtain a session identifier of the first secure session between node 70 and the server terminal 60, and to obtain a credential identifier, the credential identifier identifying a server terminal 60 of the first secure session. The intermediate node 70 acting as a client terminal is configured to associate the credential identifier to the session identifier of the first secure session, and to store the session identifier and the credential identifier associated with the session identifier of the first secure session. The intermediate node 70 acting as a client terminal is configured to receive a message requesting or accepting the establishment of the second secure session, and to obtain a credential identifier from the received message. The intermediate node 70 acting as a client terminal is configured to determine whether the obtained credential identifier matches the credential identifier associated with the session identifier of the first secure session, and to retrieve the session identifier of the first secure session, when it is determined that the obtained credential identifier matches the credential identifier associated with the session identifier of the first secure session. The intermediate node 70 acting as a client terminal is configured to initiate the establishment of the second secure session using the retrieved session identifier in an abbreviated establishment procedure of the transport security protocol, when it is determined that the obtained credential identifier matches the credential identifier associated with the session identifier of the first secure session. The intermediate node 70 acting as a client terminal is configured to initiate the establishment of the second secure session using a full establishment procedure of the transport security protocol, when it is not determined that the obtained credential identifier matches the credential identifier associated with the session identifier of the first secure session. The intermediate node 70 when acting as a server terminal is configured to obtain a session identifier of the first secure session between node 70 and client terminal 51, and to obtain a credential identifier, the credential identifier identifying a client terminal 51 of the first secure session. The intermediate node 70 acting as a server terminal is configured to associate the credential identifier to the session identifier of the first secure session; and to storing the session identifier and the credential identifier associated with the session identifier of the first secure session. The intermediate node 70 acting as a server terminal is configured to receive a message 801 requesting or accepting the establishment of the second secure session; and to obtain a credential identifier from the received message. The intermediate node 70 acting as a server terminal is configured to determine whether the obtained credential identifier matches the credential identifier associated with the session identifier of the first secure session, and to retrieve the session identifier of the first secure session, when it is determined that the obtained credential identifier matches the credential identifier associated with the session identifier of the first secure session. The intermediate node 70 acting as a server terminal is configured to send to the client terminal 50 the retrieved session identifier of the first secure session, when it is determined that the obtained credential identifier matches the credential identifier associated with the session identifier of the first session.

Figure 8:
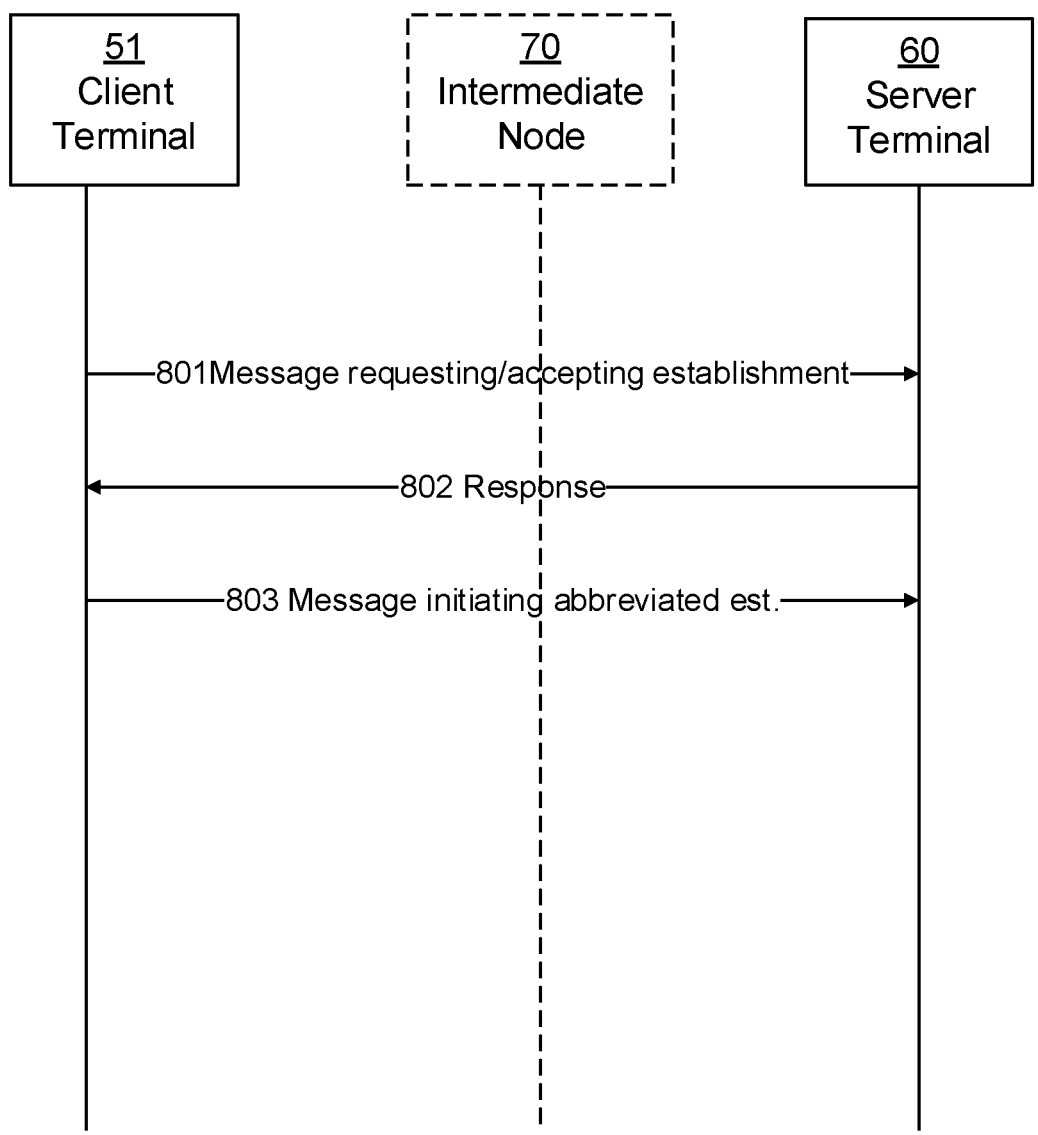
FIG. 8 is a signaling diagram illustrating another exemplary exchange of messages for establishing a second secure session according to this disclosure in an embodiment of a communication network.

FIG. 8 shows a signaling diagram illustrating another exemplary exchange of messages for establishing a second secure session according to this disclosure in an embodiment of a communication network. The signaling diagram shows a client terminal 51 and a server terminal 60. FIG. 8 illustrates one or more embodiments where the server terminal 60 instead of the client terminal 51 determines and retrieves the session identifier for the second secure session to be established, resumed and/or duplicated, by the client terminal 51. For example, a terminal acting as a TLS server identifies the resumable/duplicable TLS session instead of the terminal acting as a TLS client. The difference with the one or more embodiments illustrated in FIG. 7 lies in the party performing the identification using the remote party's credential identifier. The client terminal 51 sends a message 801 requesting or accepting establishment of a second secure session to the server terminal 60, the second secure session being additional and/or consecutive to a first secure session. The message 801 comprises a credential identifier of the client terminal 51. For example, the client terminal 51 sends a signaling message (e.g. a SIP INVITE) to establish a media session (e.g. a TLS protected fax transmission). The server terminal 60 receiving the message 801 extracts the credential identifier from the message 801. The server terminal 60 determines if the received credential identifier corresponds to a stored credential identifier of a first secure session. For example, the server terminal 60 extracts a certificate fingerprint from an SDP offer of a SIP INVITE and attempts to retrieve an associated TLS session identifier from the TLS session cache. When it is determined by the server terminal 60 or by the processing means 601 that the obtained credential identifier matches the credential identifier associated with the session identifier of the first secure session, the server terminal 60 or the processing means 601 retrieve the session identifier. The server terminal 60 accepts the session and sends the retrieved session identifier of the first secure session to the client terminal 51 in a signaling response 802. For example, if a TLS session is found by the TLS server, the TLS server sends the TLS session identifier to the remote party, i.e. the client terminal 51, in the session setup signaling (e.g. SIP). The TLS session identifier is e.g. inserted in the SDP answer. For example, a terminal accepts the call and responds with a SIP 200OK containing the SDP answer with an attribute "a=setup-passive" indicating that the terminal is to listen for incoming TCP connections and, as a consequence, is to act as the TLS server in the TLS handshake. The client terminal 51 receives the session identifier of the first secure session in e.g. the response 802. For example, the client terminal 51 receives a SIP 200 OK response and checks if a SDP answer of the SIP 200 OK response comprises a session identifier. The client terminal 51 determines if the received session identifier matches a stored session identifier of the first secure session. The client terminal 51 initiates the establishment of the second secure session using the received session identifier in an abbreviated establishment procedure of the transport security protocol, when it is determined by the client terminal 51 that the received session identifier matches the stored session identifier of the first secure session. To initiate the abbreviated establishment procedure, the client terminal 51 sends a message 803 initiating the abbreviated establishment procedure. When it is not determined by the client terminal 51 that the received session identifier matches the stored session identifier of the first secure session, the client terminal 51 initiates the establishment of the second secure session using a full establishment procedure of the transport security protocol. For example, the client terminal 51 receives a SIP 200 OK response and determines if the SDP answer of the SIP 200 OK response contains a TLS session identifier. The client terminal 51 determines if the TLS session identifier received matches a TLS session identifier stored in its TLS cache. If the client terminal 51 determines that the TLS session identifier received matches a TLS session identifier stored in its TLS cache, then the TLS client attempts to establish, resume and/or duplicate the second TLS session by including the session identifier of the first TLS session in the initial handshake message. If the TLS server does not agree to resume the session or if no existing TLS session was found due to a timeout of the session identified by the session identifier received, then a full TLS handshake is performed and a new TLS session is created. The TLS server stores the new session information in the session cache together with the credential identifier (e.g. certificate and/or certificate fingerprint) of the TLS client. Storing the certificate instead of the certificate fingerprint may be necessary when there is more than one way of calculating the certificate fingerprint, e.g. using different hash algorithms. Due to the way the TLS handshake protocol is designed, only the TLS client can request a TLS session to be re-established, resumed or duplicated. Therefore the TLS server has to send the TLS session identifier via the session setup signaling to the TLS client. The signaling message 802 comprises e.g. an additional attribute indicating the session identifier (e.g. a=tls-session-id=<session id value> in case of SIP). Indicating the session identifier in the session setup signaling is independent of the type of credential identifier used. If a terminal can be identified from the session setup signaling in some other way, then the server can still indicate the TLS session identifier in the session setup signaling. For example, if a terminal uses a TLS-PSK cipher-suite which is based on pre-shared keys instead of certificates, then a PSK identifier can be used as a credential identifier for the terminal instead of e.g. certificate fingerprints.

In one or more embodiments, the message 801 and the message 802 traverse one or more intermediate nodes 70. The one or more intermediate nodes perform for example the role of a media gateway that encrypts and decrypts the method by replacing the credential identifier of the server terminal 60 with the credential identifier of intermediate node. This results in the second secure session being established between the client terminal 51 and the intermediate node 70, and another secure session being established between the intermediate node 70 and the server terminal 60. In such a scenario, the intermediate node 70 acts as a server terminal in the transport security protocol for the second secure session towards the client terminal 51 and acts a client terminal in the transport security protocol for the other secure session towards the server terminal 60. For example, the SIP INVITE and SIP 200 OK traverse one or more signaling proxies on the way to the other endpoint. Each of these proxies can decide to insert a media gateway that encrypts and decrypts the media (for example, to perform transcoding) by replacing the certificate fingerprint and possibly (IP address, port) pair of the received message with the certificate fingerprint and possibly (IP address, port) of the media gateway. The TLS connections are thus established between the client terminal 51 and the media gateway and between the media gateway and the server terminal 60. In other words, two separate session establishments are established where the signaling proxy or media gateway takes the role of client terminal 51 when it interacts with server terminal 60 and as server terminal 60 when it interacts with the client terminal 51. The intermediate node 70 configured to act as a client terminal 51 comprises processing means configured to: send to a server terminal a message requesting or accepting the establishment of the second secure session; receive from the server terminal the session identifier of the first secure session; and determine whether the received session identifier matches the stored session identifier of the first secure session. The intermediate node 70 configured to act as a client terminal 51 comprises processing means configured to initiate the establishment of the second secure session using the received session identifier in an abbreviated establishment procedure of the transport security protocol, when it is determined that the received session identifier matches the stored session identifier of the first secure session; or to initiate the establishment of the second secure session using a full establishment procedure of the transport security protocol, when it is not determined that the received session identifier matches the stored session identifier of the first secure session.

Figure 9:
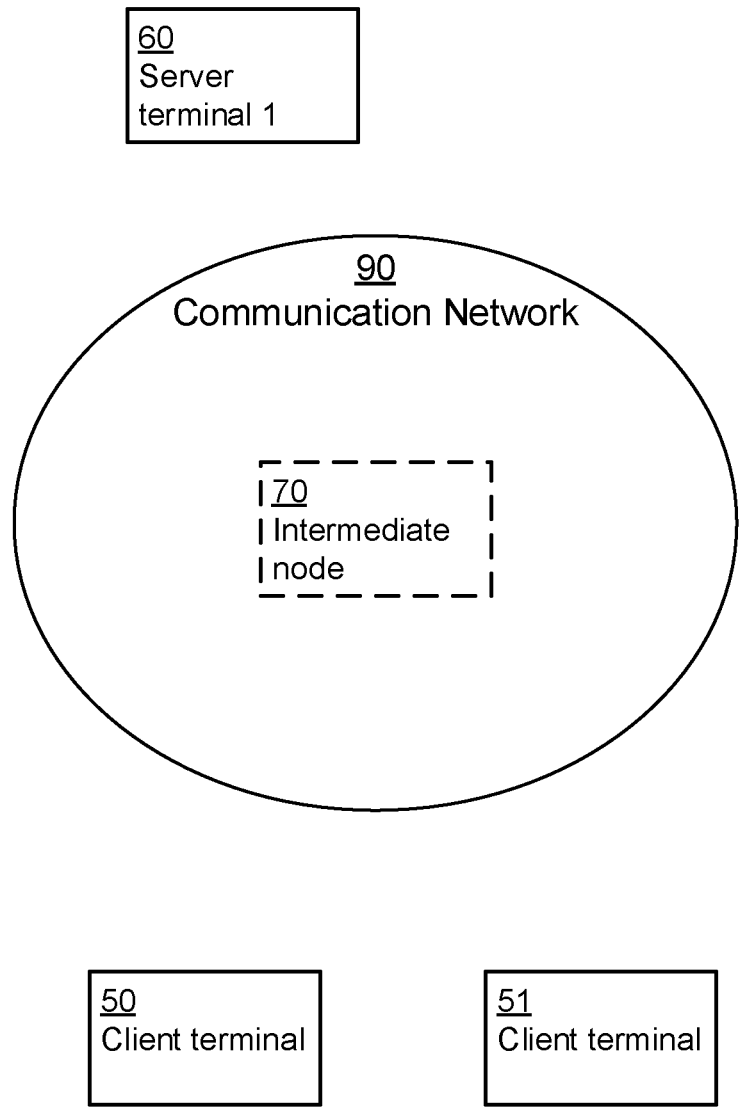
FIG. 9 is a system diagram illustrating an exemplary communication network, an exemplary client terminal and an exemplary server terminal according to this disclosure.

FIG. 9 is a system diagram illustrating an exemplary communication network 90, an exemplary client terminal 50, 51 and an exemplary server terminal 60 according to this disclosure. The communication network 90 comprises an intermediate node 70. According to some aspects of this disclosure, the communication network 90 comprises a wired communication network, and/or a wireless communication network. A wired communication network comprises e.g. an Internet protocol-based communication network, a fiber-optic communication network, a telephone network, a cable network. A wireless communication network comprises 3GPP Long term evolution, LTE, system, wideband code division multiple access, WCDMA, WiMax, wireless local area network, WLAN, a short range communication network.

It should be appreciated that FIGS. 1-4 comprises some operations which are illustrated with a darker border and some operations which are illustrated with a dashed border. The operations which are comprised in a darker border are operations which are comprised in the broadest example embodiment. The operations which are comprised in a dashed border are example embodiments which may be comprised in, or a part of, or are further operations which may be taken in addition to the operations of the border example embodiments. It should be appreciated that these operations need not be performed in order. Furthermore, it should be appreciated that not all of the operations need to be performed. The example operations may be performed in any order and in any combination.

It should be appreciated that the example operations of FIG. 1 through 4 may be performed simultaneously for any number of terminals in the communication network.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Although the description is mainly given for a terminal, it should be understood by the skilled in the art that "user equipment" is a non-limiting term which means any device, user equipment, or node capable of receiving and transmitting (e.g. PDA, laptop, mobile, sensor, fixed relay, mobile relay or even a radio base station, e.g. femto base station).

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method for enabling an establishment of a second secure session over a communication network, the second secure session being additional to a first secure session, the first secure session being established using a session establishment protocol and a transport security protocol, the method comprising:
   a first terminal obtaining a session identifier of the first secure session;
   the first terminal obtaining a credential identifier that is separate and distinct from the session identifier, the credential identifier identifying a second terminal of the first secure session;
   the first terminal associating the credential identifier with the session identifier of the first secure session;
   the first terminal storing the session identifier and the credential identifier associated with the session identifier of the first secure session;
   the first terminal receiving a message requesting the establishment of the second secure session, wherein the message contains a credential identifier and the message requesting the establishment of the second secure session was transmitted by the second terminal;
   the first terminal obtaining the credential identifier contained within the received message;
   the first terminal determining whether the credential identifier obtained from the received message matches the credential identifier associated with the session identifier; and
   as a result of determining that the obtained credential identifier matches the credential identifier associated with the session identifier, the first terminal using the session identifier to initiate the establishment of the second secure session in an abbreviated establishment procedure of the transport security protocol.

2. The method of claim 1, wherein the first terminal is a server terminal and the second terminal is a client terminal.

3. The method of claim 1, wherein the credential identifier comprises a certificate fingerprint, a certificate, and/or an identifier of a pre-shared key.

4. The method of claim 1, wherein enabling the establishment of the second secure session comprises enabling a resumption of the first secure session, and/or enabling a duplication of the first secure session.

5. The method of claim 1, wherein the transport security protocol comprises a transport layer security (TLS) protocol, a secure sockets layer (SSL) protocol, a datagram transport layer security (DTLS) protocol, and/or a datagram transport layer security protocol with an extension for secure real-time transport protocol (DTLS-SRTP).

6. The method of claim 1, wherein the session establishment protocol comprises a session initiation protocol (SIP), and/or an extensible messaging and presence protocol (XMPP).

7. The method of claim 1, wherein the communication network comprises a wired communication network, and/or a wireless communication network.

8. A computer program product comprising a non-transitory computer readable medium storing a computer program, comprising computer readable code which, when run on a processing means of a terminal, causes the terminal to perform the method as claimed in claim 1.

9. A method for enabling an establishment of a second secure session over a communication network, the second secure session being additional to a first secure session, the first secure session being established between a client and a server using a session establishment protocol and a transport security protocol, the method comprising:
   the client triggering the server to transmit to the client a session identifier as a result of the server determining that a credential identifying the client matches a stored credential, wherein the session identifier is associated with the first secure session and wherein triggering the server comprises the client sending to the server a request message requesting or accepting the establishment of the second secure session, wherein the request message contains the credential identifying the client but does not contain the session identifier;
   the client receiving from the server a response message transmitted by the server in response to the request message, wherein the response message comprises the session identifier;
   the client determining if the received session identifier matches a stored session identifier of the first secure session; and
   the client performing one of the following initiating steps:
   i) initiating the establishment of the second secure session using the received session identifier in an abbreviated establishment procedure of the transport security protocol as a result of determining that the received session identifier matches the stored session identifier of the first secure session; and
   ii) initiating the establishment of the second secure session using a full establishment procedure of the transport security protocol, as a result of determining that the received session identifier does not match the stored session identifier of the first secure session.

10. The method of claim 9, further comprising:
    receiving from the client the request message requesting or accepting the establishment of the second secure session;
    obtaining the credential identifier from the received message;
    determining whether the obtained credential identifier matches a credential identifier associated with the session identifier of the first secure session;
    retrieving the session identifier of the first secure session, when it is determined that the obtained credential identifier matches the credential identifier associated with the session identifier of the first secure session; and
    sending to the client the retrieved session identifier of the first secure session, when it is determined that the obtained credential identifier matches the credential identifier associated with the session identifier of the first session.

11. The method of claim 10, wherein sending to the client the retrieved session identifier of the first secure session comprises sending to the client the retrieved session identifier in the response message.

12. An apparatus for enabling an establishment of a second secure session over a communication network, the second secure session being additional to a first secure session, the first secure session being established using a session establishment protocol and a transport security protocol, the apparatus comprising:
    a memory; and
    a processor, wherein the apparatus is configured to:
    obtain a session identifier of the first secure session;
    obtain a credential identifier that is separate and distinct from the session identifier, the credential identifier identifying a second terminal of the first secure session;

associate the credential identifier with the session identifier of the first secure session;

store the session identifier and the credential identifier associated with the session identifier of the first secure session;

receive a message transmitted by the second terminal, the message requesting the establishment of the second secure session, wherein the message contains a credential identifier;

obtain the credential identifier contained within the received message;

determine whether the credential identifier obtained from the received message matches the credential identifier associated with the session identifier; and as a result of determining that the obtained credential identifier matches the credential identifier associated with the session identifier, use the session identifier to initiate the establishment of the second secure session in an abbreviated establishment procedure of the transport security protocol.

13. The apparatus of claim 12, wherein the memory contains instructions executable by the processor.

14. The apparatus of claim 12, wherein the apparatus is further configured to send to the terminal the retrieved session identifier of the first secure session as a result of determining that the obtained credential identifier matches the credential identifier associated with the session identifier of the first secure session.

15. A terminal configured to act as a client terminal for enabling an establishment of a second secure session over a communication network, the second secure session being additional to a first secure session, the first secure session being established using a session establishment protocol and a transport security protocol, the terminal comprising:

a memory; and a processor, wherein the terminal is configured to:

trigger the server to transmit to the client a session identifier as a result of the server determining that a credential identifying the client matches a stored credential, wherein the session identifier is associated with the first secure session and wherein triggering the server comprises the client sending to the server a request message requesting or accepting the establishment of the second secure session, wherein the request message contains the credential identifying the client but does not contain the session identifier;

receive from the server a response message transmitted by the server in response to the request message, wherein the response message comprises the session identifier;

determine if the received session identifier matches a stored session identifier of the first secure session; and perform one of the following initiating steps:

i) initiating the establishment of the second secure session using the received session identifier in an abbreviated establishment procedure of the transport security protocol as a result of determining that the received session identifier matches the stored session identifier of the first secure session; and ii) initiating the establishment of the second secure session using a full establishment procedure of the transport security protocol, as a result of determining that the received session identifier does not match the stored session identifier of the first secure session.

\* \* \* \* \*